(12) United States Patent
Shimizu

(10) Patent No.: US 8,737,836 B2
(45) Date of Patent: May 27, 2014

(54) APPARATUS AND METHOD FOR SETTING AN OPTICAL PATH IN AN OPTICAL NETWORK

(75) Inventor: Sho Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 144 days.

(21) Appl. No.: 13/477,333

(22) Filed: May 22, 2012

(65) Prior Publication Data

US 2012/0301143 A1  Nov. 29, 2012

(30) Foreign Application Priority Data

May 27, 2011 (JP) ................................ 2011-119747
Nov. 25, 2011 (JP) ................................ 2011-257200

(51) Int. Cl.
*H04J 14/00* (2006.01)
(52) U.S. Cl.
USPC .............................................. 398/58; 398/45
(58) Field of Classification Search
USPC ....................................................... 398/45, 58
See application file for complete search history.

(56) References Cited

U.S. PATENT DOCUMENTS

| 7,020,394 | B2 * | 3/2006 | Zhang et al. | 398/25 |
| 7,362,974 | B2 * | 4/2008 | De Patre et al. | 398/50 |
| 2012/0087665 | A1 * | 4/2012 | Li et al. | 398/79 |
| 2013/0031244 | A1 * | 1/2013 | Zhang et al. | 709/224 |

FOREIGN PATENT DOCUMENTS

| JP | 2006-253786 | 9/2006 |
| JP | 2010-062647 | 3/2010 |
| JP | 2010-166378 | 7/2010 |
| JP | 2010-263442 | 11/2010 |

OTHER PUBLICATIONS

Xia et al., "Green Provisioning for Optical WDM Networks", Mar. 2011, IEEE Journal of Selected Topics in Quantum Electronics, vol. 17, No. 2, pp. 437-445.*
Ming Xia et al., "Green Provisioning for Optical WDM Networks", IEEE Journal of Selected Topics in Quantum Electronics, vol. 17, No. 2, Mar./Apr. 2011, pp. 437-445.

* cited by examiner

*Primary Examiner* — Dalzid Singh
(74) *Attorney, Agent, or Firm* — Staas & Halsey LLP

(57) ABSTRACT

An auxiliary graph representing connection relations between nodes on a plurality of lightpaths in an optical network is created using a plurality of edges each connecting a pair of nodes. The plurality of lightpaths includes first lightpaths existing in the optical network and the second lightpaths to be set to accommodate traffic that is newly generated for the optical network. Each of the plurality of edges is assigned a weight value indicating a magnitude of increase in power consumption of network devices allocated to the each edge. For start and end nodes, a minimum weight path that has a path weight value minimum among paths each being a continuous sequence of edges that starts from the start node and reaches the end node is obtained, where the path weight value is a total sum of weight values assigned to the continuous sequence of edges.

16 Claims, 28 Drawing Sheets

| WAVELENGTH | START POINT | END POINT | PATH | AVAILABLE BANDWIDTH |
|---|---|---|---|---|
| 1 | 1 | 4 | 1, 2, 4 | 5 Gbps |
| 2 | 2 | 3 | 2, 4, 3 | 7 Gbps |

FIG. 10

POWER MODEL STORAGE UNIT (214)

| POWER MODEL OF ROUTER | |
|---|---|
| FIXED POWER CONSUMPTION | LINEAR POWER CONSUMPTION INCREMENT (PER Gbps) |
| 500 W | 20 W/Gbps |

| POWER MODEL OF OPTICAL REGENERATOR |
|---|
| POWER CONSUMPTION OF ONE OPTICAL REGENERATOR |
| 50 W |

| POWER MODEL OF OPTICAL AMPLIFIERS |
|---|
| POWER CONSUMPTION OF ONE OPTICAL AMPLIFIER |
| 5 W |

FIG. 11

TRAFFIC INFORMATION STORAGE UNIT (213)

| START PHYSICAL NODE | END PHYSICAL NODE | BANDWIDTH USED |
|---|---|---|
| 2 | 4 | 4 Gbps |

| START NODE | END NODE | CORRESPONDING LIGHTPATH | WEIGHT |
|---|---|---|---|
| 1, IN | 1, OUT | NONE | 80 |
| 1, OUT | 4, IN | 1→4 (WAVELENGTH 1, PATH: 1, 2, 4) | $\varepsilon$ |
| 2, OUT | 3, IN | 2→3 (WAVELENGTH 2, PATH: 2, 4, 3) | $\varepsilon$ |
| ... | ... | ... | ... |

WAVELENGTH 1

WAVELENGTH 2

FIG. 15

| START NODE | END NODE | SHORTEST PATH | PATH LENGTH | EDGE CREATION |
|---|---|---|---|---|
| 1 | 2 | 1, 3, 4, 2 | 2000 | IMPOSSIBLE |
| 1 | 3 | 1, 3 | 400 | POSSIBLE |
| 1 | 4 | 1, 3, 4 | 1400 | POSSIBLE |
| 2 | 1 | 2, 1 | 1000 | POSSIBLE |
| 2 | 3 | 2, 1, 3 | 1400 | POSSIBLE |
| 2 | 4 | 2, 1, 3, 4 | 2400 | IMPOSSIBLE |
| 3 | 1 | 3, 1 | 400 | POSSIBLE |
| 3 | 2 | 3, 4, 2 | 1600 | IMPOSSIBLE |
| 3 | 4 | 3, 4 | 1000 | POSSIBLE |
| 4 | 1 | 4, 3, 1 | 1400 | POSSIBLE |
| 4 | 2 | 4, 2 | 600 | POSSIBLE |
| 4 | 3 | 4, 3 | 1000 | POSSIBLE |

WAVELENGTH 1

WAVELENGTH 2

FIG. 17

| START NODE | END NODE | PHYSICAL PATH OF CORRESPONDING LIGHTPATHS | WEIGHT |
|---|---|---|---|
| 1, IN | 1, OUT | NONE | 50 |
| 1, OUT | 4, IN | 1, 3, 4 | 105 |
| 2, OUT | 1, IN | 2, 1 | 70 |
| ... | ... | ... | ... |

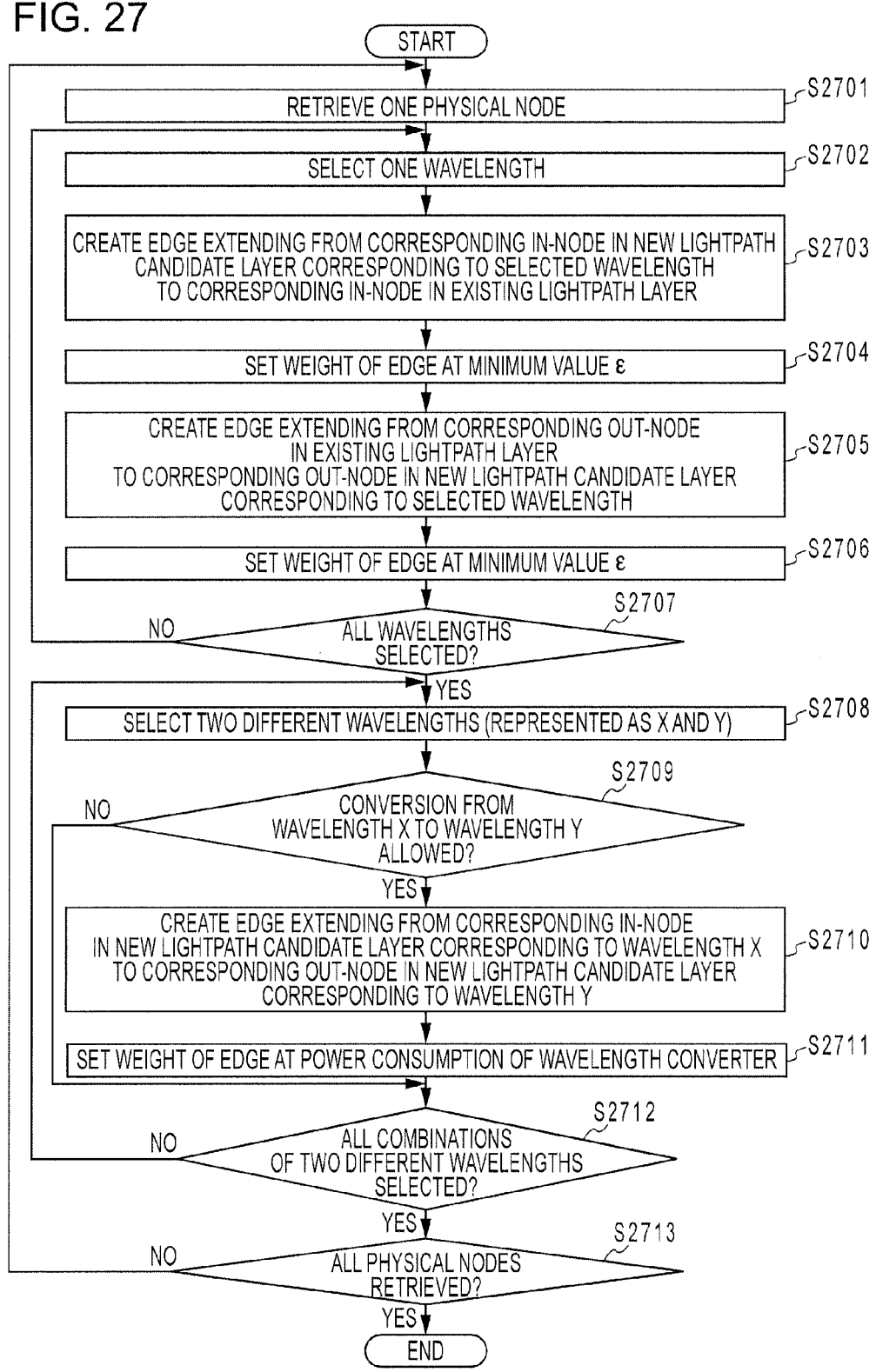

APPARATUS AND METHOD FOR SETTING AN OPTICAL PATH IN AN OPTICAL NETWORK

CROSS-REFERENCE TO RELATED APPLICATIONS

This application is based upon and claims the benefit of priority of the prior Japanese Patent Application No. 2011-119747, filed on May 27, 2011, and the Japanese Patent Application No. 2011-257200, filed on Nov. 25, 2011, the entire contents of which are incorporated herein by reference.

FIELD

The embodiments discussed herein are related to an apparatus and method for setting an optical path (or a lightpath) in an optical network.

BACKGROUND

In an Internet protocol/wavelength division multiplexing (IP/WDM) network that is formed by combining an IP network and an optical network (WDM network) based on the WDM technology, the IP network is overlaid on the WDM network. The WDM network and IP network are referred to as a WDM layer (Or an optical layer) and an IP layer, respectively. The WDM layer, formed with an optical cross-connect (OXC), may create a logical communication channel referred to as a lightpath (or an optical path) between arbitrary two nodes. When setting a lightpath, a wavelength common to a pair of nodes coupled by the lightpath is usually used, thereby allowing a communication channel with a large capacity equivalent to the capacity of one wavelength (for example, 10 Gbps or 40 Gbps) to be logically created between the pair of nodes.

Two nodes linked by a lightpath become mutually adjacent nodes on the IP layer, and a router connected in correspondence to an intermediate OXC through which the lightpath passes is cut through, eliminating the need for a packet transfer process from the router. Power consumption per unit bit rate in a transfer process by the OXC is smaller than power consumption per unit bit rate in the transfer process by the router. Whereas granularity in the transfer process by the OXC is larger than granularity in the transfer process by the router.

In view of the above situation, a technology to achieve small power consumption by a node device on a network including lightpaths with different quality levels is proposed, in which the node device has a plurality of error correcting decoders and does not carry out subsequent correction decoding when an error is corrected before a maximum number of repetitions in iterative decoding is reached (for example, see Japanese Laid-open Patent Publication No. 2010-166378). In another technology in which a reward for successful lightpath setting and a cost for failed lightpath setting are preset in a table for each service class, whether to accept a lightpath setting request is determined with reference to the table so as to achieve effective usage of lightpaths and differentiate service classes (for example, see Japanese Laid-open Patent Publication No. 2010-263442).

In another technology to preventing optical regenerators from generating signal errors, lightpath settings are monitored by a monitoring control unit and whether to allow transmission through a new lightpath is determined from topology information, path information, and other information that are held by the monitoring control unit, so that incorrect settings are prevented (for example, see Japanese Laid-open Patent Publication No. 2010-62647). In a method of searching for an optimum lightpath on a mesh optical WDM network, a new lightpath topology is initialized and two nodes are selected by using random numbers, after which whether a lightpath is allowed to be set between the two nodes is determined, whether lightpaths have been assigned to all transmission and reception interfaces is determined, and whether the new lightpath topology forms a connected graph is determined. These processes enable a search for an optimum lightpath topology without searching for lightpath topologies of all patterns (for example, see Japanese Laid-open Patent Publication No. 2006-253786).

A method of selecting a lightpath and calculating a path is also proposed that creates an auxiliary graph that includes a virtual topology layer and a physical layer and uses the power consumption of routers and the power consumption of optical fibers as the weights of edges so as to obtain a path having a least power consumption, and an effect of reducing power consumption on an IP/WDM network is indicated (for example, see M. Xia, M. Tornatore, Y. Zhang, P. Chowdhury, C. U. Martel, and B. Mukherjee, "Green Provisioning for Optical WDM Networks", *IEEE Journal of Selected Topics in Quantum Electronics*, vol. 17, no. 2, pp. 437-445, March 2011).

SUMMARY

According to an aspect of the invention, there is provided an apparatus for setting a lightpath in an optical network. The apparatus creates an auxiliary graph representing connection relations between nodes on a plurality of lightpaths in the optical network using a plurality of edges each connecting a pair of nodes on the plurality of lightpaths. The plurality of lightpaths include first and second one or more lightpaths where the first one or more lightpaths indicate lightpaths that exist in the optical network and the second one or more lightpaths indicate candidate lightpaths that are to be set to accommodate traffic that is newly generated for the optical network. Each of the plurality of edges is assigned a weight value indicating a magnitude of increase in power consumption of network devices that are allocated to a lightpath in association with the each of the plurality of edges. The apparatus obtains, for start and end nodes in the optical network, a minimum weight path that has a path weight value minimum among paths each being a continuous sequence of edges that starts from the start node and reaches the end node, where the path weight value is a total sum of weight values assigned to the continuous sequence of edges.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of power model information, according to an embodiment;

FIG. 11 is a diagram illustrating an example of traffic information, according to an embodiment;

FIG. 15 is a diagram illustrating an example of a table that represents shortest paths among all physical nodes in association with the lengths of the shortest paths with respect to wavelength 1, according to an embodiment;

FIG. 17 is a diagram illustrating an example of a table that represents information on a new lightpath candidate layer, according to an embodiment;

FIG. 27 is a diagram illustrating an example of an operational flowchart for creating inter-layer connections, according to a third embodiment.

DESCRIPTION OF EMBODIMENTS

Figure 1:
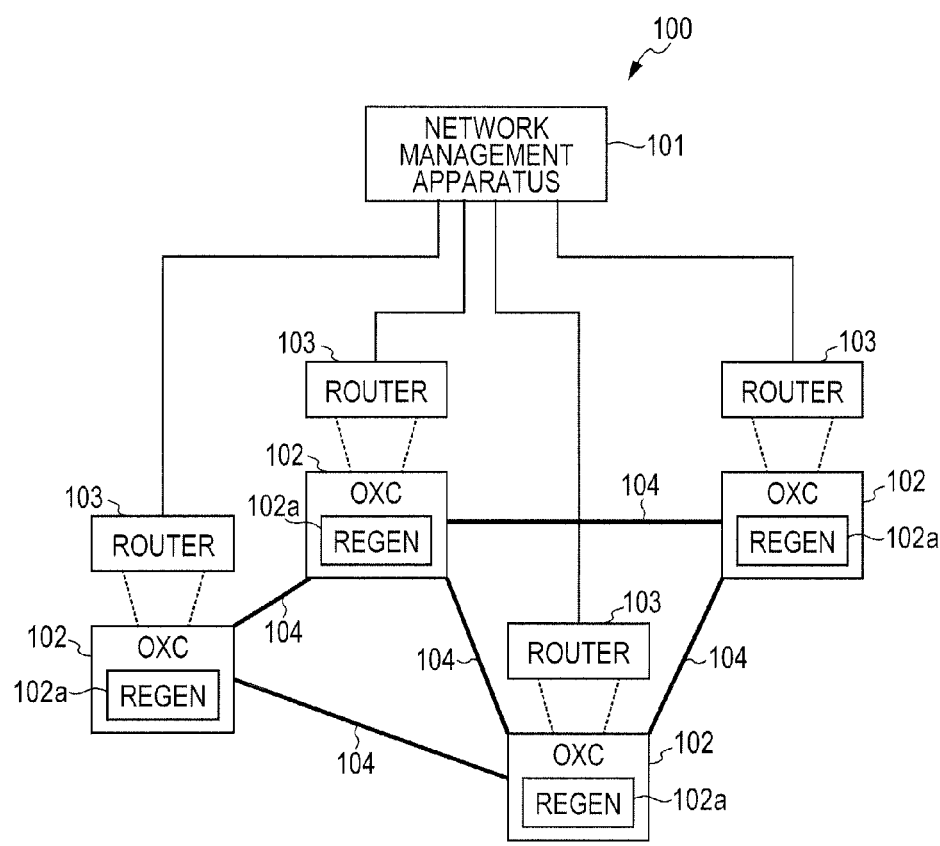
FIG. 1 is a diagram illustrating a configuration example of an entire network including a network management apparatus, according to an embodiment.

In the above mentioned technologies that are disclosed in Japanese Laid-open Patent Publication Nos. 2010-166378, 2010-263442, 2010-62647, and 2006-253786, it is difficult to set an optimum lightpath by which the power consumption of the entire network is reduced when a new lightpath is set. Since the power consumption of the above-mentioned routers disposed on the network and other network devices has been increased due to a recent increase in network traffic, it is desirable that the power consumption of the IP/WDM network be reduced by dynamically setting lightpaths according to varying traffic. However, the technologies in Japanese Laid-open Patent Publication Nos. 2010-166378, 2010-263442, 2010-62647, and 2006-253786 are insufficient to achieve this. When there is an existing lightpath, it is also difficult to search for a path that may reduce power consumption during the setting of a new lightpath.

In the technology described in "Green provisioning for optical wdm networks", unlike the technologies described in Japanese Laid-open Patent Publication Nos. 2010-166378, 2010-263442, 2010-62647, and 2006-253786, the power consumption of the IP/WDM network may be reduced by dynamically setting a lightpath according to varying traffic, but the presence of optical optical regenerators is not considered. The optical optical regenerator is mounted in an OXC to compensate for deterioration of optical signals when a long-distance lightpath is set. In the case, the setting of a lightpath is subjected to the constraint that the length of a segment delimited by optical regenerators does not exceed a prescribed value depending on an allowable value in optical signal quality deterioration. Hereinafter, the above-mentioned constraint will be referred to as the optical optical regenerator insertion constraint. Accordingly, since the presence of optical regenerators is ignored in the technology described in "Green provisioning for optical wdm networks", the technology involves problems described below.

A first problem is that it is difficult to identify the location of an OXC at which an optical regenerator is to be used. A second problem is that a lightpath passing through an OXC including unavailable optical regenerator is outputted as a solution and, as a result, there are no resources left for this lightpath, thereby generating a path segment that fails to accommodate a lightpath. A third problem is that since an effect due to an increase in power caused by the use of optical regenerators is not considered, a non-optimum lightpath may be selected and power consumption may thereby be increased.

Preferred embodiments will be described in detail with reference to the accompanying drawings. In the embodiments, a path is dynamically determined for traffic that has been newly generated within a network. The generated traffic is assumed to have information on a source node, a destination node, and a bandwidth to be used. An auxiliary graph created in the embodiments includes one existing lightpath layer and as many new lightpath candidate layers as the number of wavelengths, and an increment in power consumption that is caused when target traffic is accommodated is assigned to an edge (a link connecting a pair of nodes), as a weight value of the edge. In consideration of the installation of a new lightpath, the use of an existing lightpath, and both, a path of lightpaths that would bring a least power consumption increment is determined by obtaining a minimum weight path from the auxiliary graph. Thus, the power consumption of network devices on the network may be reduced and efficient lightpaths may be set.

The auxiliary graphs has the following features (1) to (4).

(1) A new lightpath candidate layer and an existing lightpath layer are each formed with two types of nodes (in-nodes and out-nodes) corresponding to inputs and outputs of physical nodes, respectively. Each layer includes as many nodes as twice the number of the physical nodes.

(2) The existing lightpath layer has, for each of physical nodes, a first edge that extends from an in-node of the each physical node to an out-node of the each physical node, and an increment in power consumption of a router is assigned to the first edge, as a weight value of the first edge. Further, the existing lightpath layer has a second edge that extends from an out-node corresponding to a start physical node on an existing lightpath to an in-node corresponding to an end node of the existing lightpath, and an increment in power consumption caused by the use of the existing lightpath is assigned to the second edge, as a weight value of the second edge.

(3) When an optical regenerator is allowed to be used for a physical node, a new lightpath candidate layer includes a first edge extending from an in-node corresponding to the physical node to an out-node corresponding to the physical node, and an increment in power consumption caused by the use of the optical regenerator is assigned to the first edge, as a weight value of the first edge. The new lightpath candidate layer further includes a second edge that connects two physical nodes between which a lightpath is allowed to be set without an optical regenerator and extends from an out-node corresponding to one of the two physical nodes (a start physical node) to an in-node corresponding to the other one of the two physical nodes (an end physical node), where increment in the power consumption of an optical fiber through which a lightpath is set between the two physical nodes is assigned to the second edge, as a weight value of the second edge.

(4) An edge is provided between two nodes that correspond to the same physical node and are respectively located in different layers.

(Entire Structure of a Network)

FIG. 1 is a diagram illustrating a configuration example of an entire network including a network management apparatus, according to an embodiment. A network 100, for example, a WDM network, may be configured to include a network management apparatus 101 that determines a path of a lightpath for each piece of traffic on the network 100. Although, in FIG. 1, a control server that manages the entire network 100 in a centralized manner is used as an example of the network management apparatus 101, the embodiment is not limited to this, and a plurality of nodes may perform the function of the network management apparatus 101 in a distributed manner.

As illustrated in FIG. 1, a physical node may be configured to include an OXC 102 and a router 103, and a plurality of physical nodes are mutually connected through optical fibers 104. The OXC 102 and router 103 installed at the same location are mutually connected. The OXC 102 and router 103 at the same location may be integrated. Each OXC 102 includes an optical regenerator (Regen) 102a. The optical regenerator 102a may be of a wave-length-dependent type available for a fixed wavelength or may be of a wavelength-independent type.

(First Embodiment—an Example of a Configuration by which an Auxiliary Graph is Created to Calculate a path each time Traffic is Generated)

Figure 2:
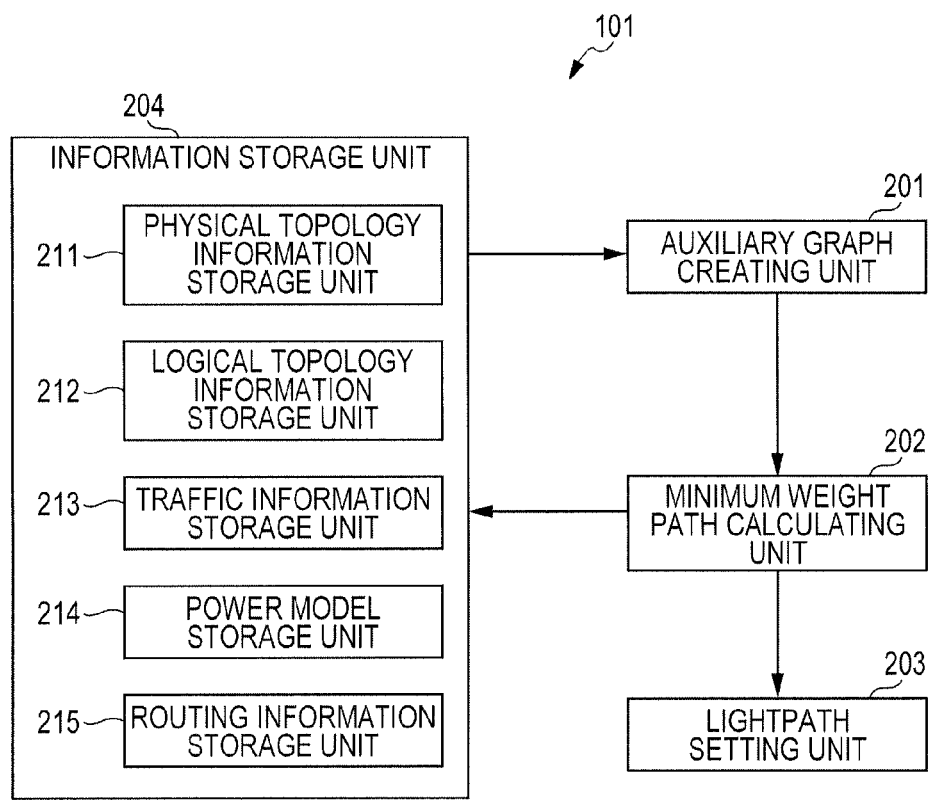
FIG. 2 is a diagram illustrating a configuration example of a network management apparatus, according to a first embodiment.

FIG. 2 is a diagram illustrating a configuration example of a network management apparatus, according to a first embodiment. In the first embodiment, a configuration will be described in which an auxiliary graph is created to calculate paths of lightpaths each time traffic is generated.

The network management apparatus 101 may be configured to include an auxiliary graph creating unit 201, a minimum weight path calculating unit 202, a lightpath setting unit 203, and an information storage unit 204. The auxiliary graph creating unit 201 creates an auxiliary graph according to a detected current network state. The minimum weight path calculating unit 202 calculates a minimum weight path on the auxiliary graph created by the auxiliary graph creating unit 201, for example, based on the general Dijkstra's algorithm. The lightpath setting unit 203 sets a new lightpath according to the calculation result obtained from the minimum weight path calculating unit 202. The information storage unit 204 stores various types of information used in processes carried out by individual constituent units.

The information storage unit 204, which stores a plurality of information items, may be configured to include, for example, a physical topology information storage unit 211, a logical topology information storage unit 212, a traffic information storage unit 213, and a power model storage unit 214. The physical topology information storage unit 211 stores physical topology information such as information on the structures of the OXC 102 and router 103 that constitute a physical node on the optical network and information on mutual connection of physical nodes. The logical topology information storage unit 212 stores logical topology information such as information on the setting states of the current lightpaths. The traffic information storage unit 213 stores information on pieces of traffic on which routing processing is to be performed. The power model storage unit 214 stores information on power consumption models of devices on the optical network. The routing information storage unit 215 stores routing information on all pieces of traffic that are present on the optical network.

Figure 3:
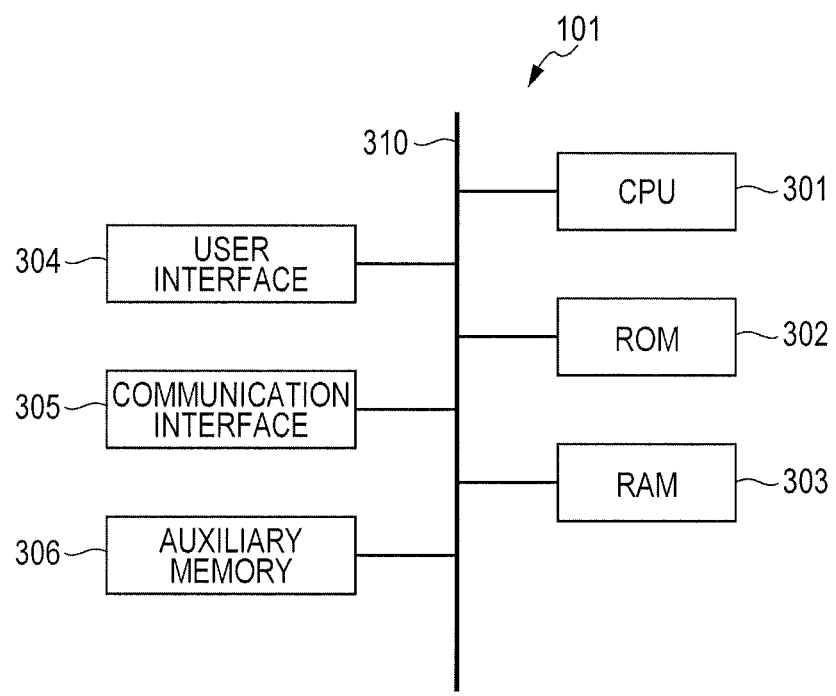
FIG. 3 is a diagram illustrating an example of a hardware configuration of a network management apparatus, according to an embodiment.

FIG. 3 is a diagram illustrating an example of a hardware configuration of a network management apparatus, according to an embodiment. The functions of the network management apparatus 101 illustrated in FIG. 2 may be implemented using a general computer. For example, the network management apparatus 101 may be configured to include a central processing unit (CPU) 301, a read-only memory (ROM) 302, a random-access memory (RAM) 303, a user interface 304, a communication interface 305, and an auxiliary memory 306. The CPU 301, the ROM 302, the RAM 303, the user interface 304, and the communication interface 305 are mutually connected via a bus 310.

The CPU 301 controls the entire network management apparatus 101. The ROM 302 may store a network management program or may store a processing program involved in calculation of paths of lightpaths. The CPU 301 may execute a process to calculate paths of lightpaths by executing the network management program stored in the ROM 302. The RAM 303 may be used as a work area during the processing of the CPU 301.

The user interface 304 may be implemented, for example, using a keyboard that accepts manipulation inputs from a user. An output device may be implemented, for example, using a display or a speaker, and configured to output management information and the like on a screen or as sounds. The communication interface 305 may be implemented, for example, using a data input port that collects network information. The auxiliary memory 306 may be implemented, for example, using a non-volatile memory, a hard disk, or a compact disk-read-only memory (CD-ROM). The auxiliary memory 306 may store a network management program or store a processing program involved in calculation of paths of lightpaths. The CPU 301 may read programs stored in the auxiliary memory 306 into the RAM 303 and execute the programs.

In FIG. 2, the auxiliary graph creating unit 201, minimum weight path calculating unit 202, and lightpath setting unit 203 may be implemented, for example, using the CPU 301. The information storage unit 204 illustrated in FIG. 2 may be implemented, for example, using the RAM 303 or auxiliary memory 306. Upon detecting traffic through the communication interface 305, the CPU 301 executes a series of path calculation processes from auxiliary graph creation to lightpath setting.

(Outline of Path Calculations)

Figure 4:
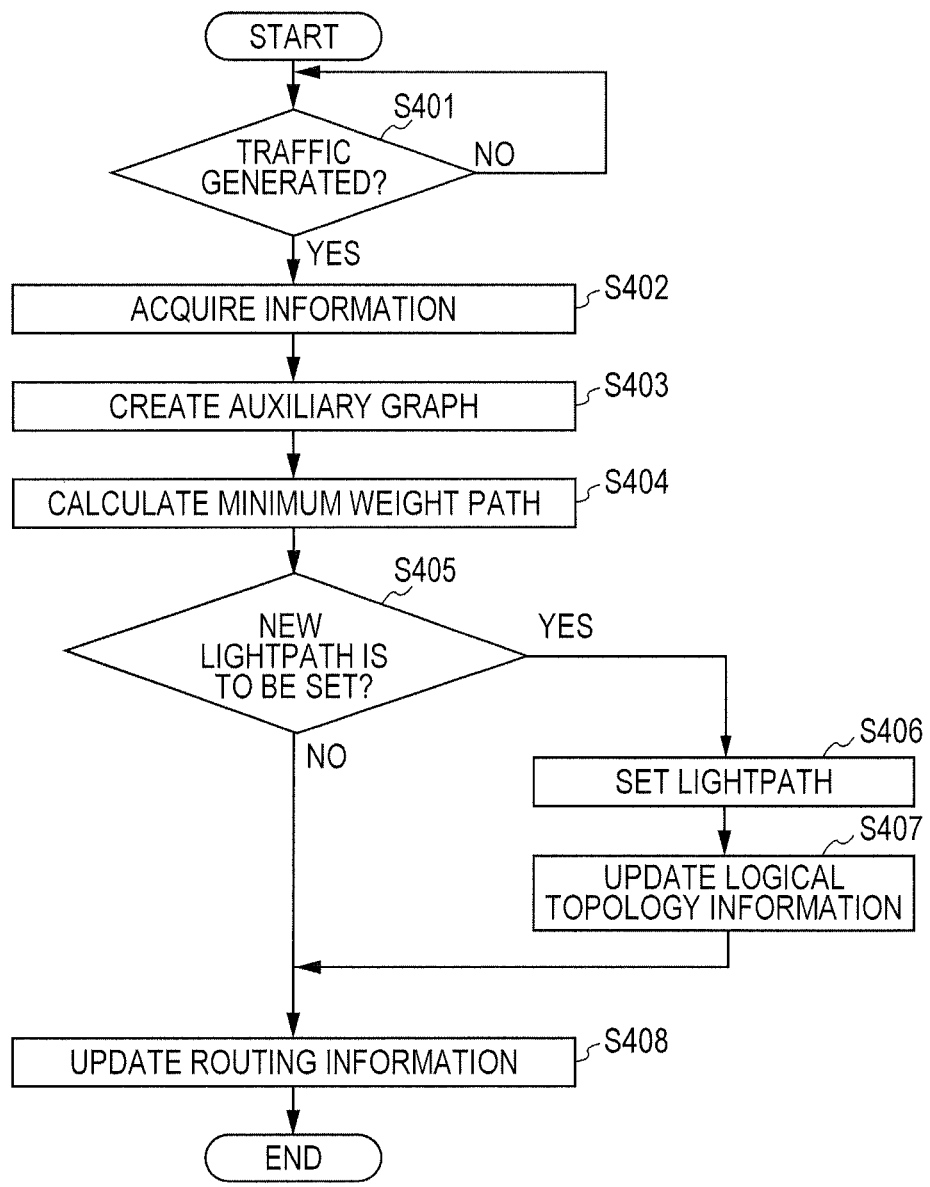
FIG. 4 is a diagram illustrating an example of an operational flowchart for path calculation processing performed by a network management apparatus, according to a first embodiment.

FIG. 4 is a diagram illustrating an example of an operational flowchart for path calculation processing performed by a network management apparatus, according to a first embodiment. In the first embodiment, each time traffic is generated, an auxiliary graph is created based on the physical topology information, logical topology information, power model information, routing information, and traffic information.

In operation S401, generation of traffic is awaited (NO in operation S401). When traffic is generated (YES in operation S401), in operation S402, the auxiliary graph creating unit 201 acquires, from the information storage unit 204, various types of information including physical topology information, logical topology information, power model information, routing information, and traffic information.

In operation S403, the auxiliary graph creating unit 201 creates an auxiliary graph, based on the acquired information, that represents a network state at the time when the traffic is generated. The method of creating the auxiliary graph will be described later in detail.

In operation S404, the minimum weight path calculating unit 202 calculates a minimum weight path on the created auxiliary graph.

In operation S405, the lightpath setting unit 203 determines, based on the calculated minimum weight path, whether a new lightpath is to be set for the generated traffic. When a new lightpath is to be set (YES in operation S405), in operation S406, the lightpath setting unit 203 sets a lightpath for the generated traffic.

In operation S407, the lightpath setting unit 203 updates the logical topology information stored in the logical topology information storage unit 212.

In operation S408, the lightpath setting unit 203 updates the routing information stored in the routing information storage unit 215, and the processing is terminated.

Meanwhile, in operation S405, when a new lightpath is not to be set (NO in operation S405), the lightpath setting unit 203 updates the routing information including the generated traffic (in operation S408), and the processing is terminated.

(Method of Creating an Auxiliary Graph)

In the creation of the auxiliary graph described above, let $P_{router}$ be the power consumption of one router 103, let $P_{fiber}$ be the power consumption of one optical fiber 104, and let $P_{regen}$ be the power consumption of one optical regenerator 102a. Further, let B be the amount of traffic per unit time that is processed by one router 103. Then, $P_{router}$ is ic represented by $$P_{router} = M_{router}(B) \quad (1)$$

where $M_{router}$ represents the power consumption model of the router 103, and $M_{router}(B)$ indicates the power consumption of the router 103 when the router 103 processes traffic at a rate of B according to the power consumption model $M_{router}$.

Further, let $P_{amp}$ be the power consumption per one wavelength of an optical amplifier disposed in the optical fiber 104, let $R_{amp}$ be the effective range (optically amplifiable distance) of the optical amplifier, and let L be the length of the optical fiber 104. Then, $P_{fiber}$ is represented by $$P_{fiber} = P_{amp} \times \left( \left\lfloor \frac{L}{R_{amp}} \right\rfloor + 2 \right) \quad (2)$$

Here, it is assumed that $P_{regen}$ is a fixed value. Let C be a bandwidth of one wavelength, let W be the number of wavelengths multiplexed in one optical fiber, let $G_{physical} = (V_{oxc}, E_{fiber})$ be the physical topology, let $G_{logical} = (V_{router}, E_{lightpath})$ be the logical topology, and let $R_{regen}$ be an effective range (optically regeneratable and repeatable distance) of the optical regenerator 102a. Here, in general, G represents a graph (V, E) consisting of a set of vertices V and a set of edges E. In the case, $V_{oxc}$ represents a set of vertices consisting of OXCs, $V_{router}$ represents a set of vertices consisting of routers, $E_{fiber}$ represents a set of edges consisting of fibers, and $E_{lightpath}$ represents a set of edges consisting of lightpaths. In the case, it is assumed that the generated traffic is transmitted from router $v_s \in V_{router}$ to router $v_d \in V_{router} (s \neq d)$ using bandwidth b (bps). Further, the above mentioned effective range indicates constraint (referred to below as optical regenerator insertion constraint) that a distance between optical regenerators should be within a prescribed value that is determined depending on an allowable value in optical signal quality deterioration.

Figure 5:
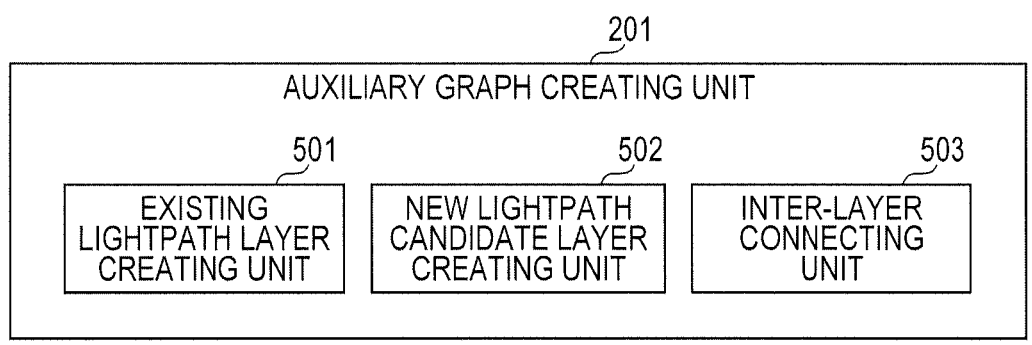
FIG. 5 is a diagram illustrating a configuration example of an auxiliary graph creating unit, according to an embodiment.

FIG. 5 is a diagram illustrating a configuration example of an auxiliary graph creating unit, according to an embodiment. The auxiliary graph described above includes one existing lightpath layer and W new lightpath candidate layers where W is a natural number. The auxiliary graph creating unit 201 includes an existing lightpath creating unit 501 that creates the existing lightpath layer, a new lightpath candidate layer creating unit 502 that creates the new lightpath candidate layers, and an inter-layer connecting unit 503 that mutually connects the created layers.

(Creation of an Existing Lightpath Layer)

An existing lightpath layer is created, for example, by a procedure described below.

(1) Two types of nodes (in-node and out-node) that correspond to an input and an output, respectively, are created for each node $v_i$ included in $V_{router}$. An in-node in the existing lightpath layer is represented as $v^E_{i,in}$, and an out-node in the existing lightpath layer is represented as $v^E_{i,out}$.

(2) An edge extending from $v^E_{i,in}$ to $v^E_{j,out}$ is created for each node $v_i$ included in $V_{router}$. Let B be the amount of traffic per unit time that is processed by the router 103 of node $v_i$ at the current point in time, and let $m^i_{router}$ be the power consumption model of the router 103. Then, a weight of the edge is determined to be an increment in the power consumption of the router 103, and the weight is represented by the equation $M^i_{router}(B+b) - M^i_{router}(B)$.

(3) An edge extending from $v^E_{i,out}$ to $v^E_{j,in}$ is created for each existing lightpath $e_{i,j}$, included in the $E_{lightpath}$, that has an available bandwidth equal to or greater than bandwidth b of the traffic. Here, the weight of the created edge is set at minimum value $\epsilon$.

Figure 6:
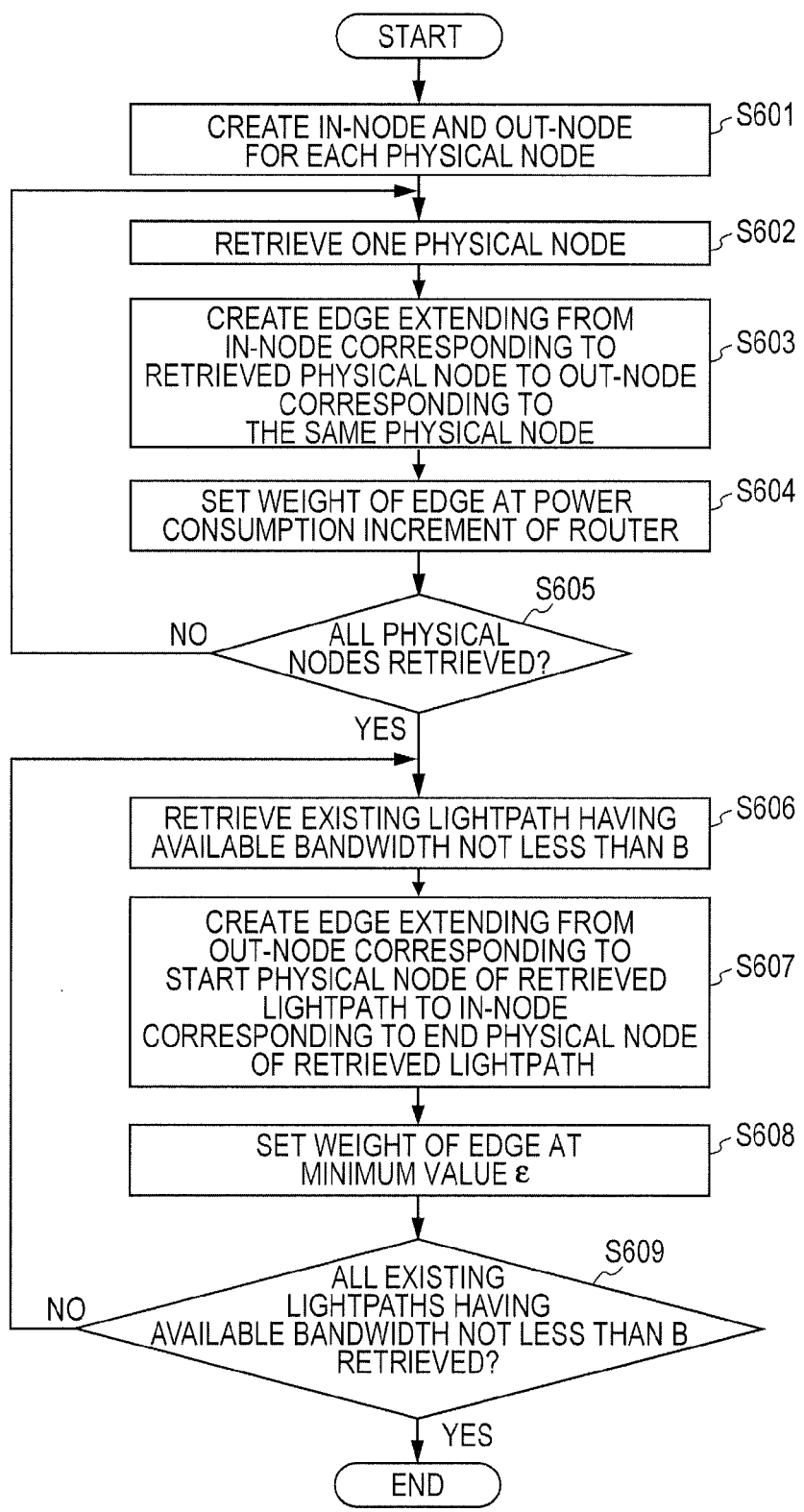
FIG. 6 is a diagram illustrating an example of an operational flowchart for creating an existing lightpath layer, according to an embodiment.

FIG. 6 is a diagram illustrating an example of an operational flowchart for creating an existing lightpath layer, according to an embodiment. A creation process executed by the existing lightpath creating unit 501 will be described.

In operation S601, the existing lightpath creating unit 501 creates an in-node and an out-node for each of a plurality of physical nodes, based on the information stored in the physical topology information storage unit 211.

In operation S602, the existing lightpath creating unit 501 retrieves one physical node to be processed.

In operation S603, the existing lightpath creating unit 501 creates an edge that extends from an in-node corresponding to the retrieved physical node to an out-node corresponding to the same retrieved physical node.

In operation S604, the existing lightpath creating unit 501 sets a weight of the edge at an increment in the power consumption of the router 103.

In operation S605, it is determined whether all physical nodes have been retrieved or not. When all physical nodes have not been retrieved (NO in operation S605), the processing returns to operation S602. When all physical nodes have been retrieved (YES in operation S605), the processing proceeds to next operation S606.

In operation S606, the existing lightpath creating unit 501 retrieves an existing lightpath having an available bandwidth not less than bandwidth b of the traffic.

In operation S607, the existing lightpath creating unit 501 creates an edge that extends from an out-node corresponding to the start physical node of the retrieved lightpath to an in-node corresponding to the end physical node of the retrieved lightpath.

In operation S608, the existing lightpath creating unit 501 sets a weight of the edge at the minimum value $\epsilon$ (for example, $10^{-6}$).

In operation S609, it is determined whether all existing lightpaths having an available bandwidth not less than b have been retrieved or not. When all such existing lightpaths have not been retrieved (NO in operation S609), the processing returns to operation S606. When all such existing lightpaths have been retrieved (YES in operation S609), the processing is terminated.

(Creation of a New Lightpath Candidate Layer)

A new lightpath candidate layer is created for each wavelength, for example, by a procedure described below. In the following procedure, it is assumed that a new lightpath candidate layer is created for wavelength identifier w∈W where W is a set of wavelength identifiers that identify wavelengths to be used and are continuous natural numbers starting from 1. Hereinafter, a wavelength identified by w will be also expressed as "wavelength w".

(1) Two types of nodes (in-node and out-node) are created for each node v, included in $V_{oxc}$. An in-node that corresponds to node $v_i$ and is in the new lightpath candidate layer corresponding to wavelength identifier w is represented as $v^{N,w}_{i,in}$, and an out-node that corresponds to node $v_i$ and is in the new lightpath candidate layer corresponding to wavelength identifier w is represented as $v^{N,w}_{i,out}$.

(2) An edge extending from $v^{N,w}_{i,in}$ to $v^{N,w}_{i,out}$ is created for each node $v_i$ included in $V_{oxc}$ when the each node $v_i$ includes an available optical regenerator 102a. A weight of the edge is set at the power consumption $P_{regen}$ of the optical regenerator 102a.

(3) Assuming that a start node and an end node between which a lightpath is allowed to be set using a wavelength identified by w without using the optical regenerator 102a are respectively represented by $v_i \in V_{oxc}$ and $v_j \in V_{oxc}$, an edge extending from $v^{N,w}_{i,out}$ to $v^{N,w}_{j,in}$ is created. Here, a weight of the edge is set at the total power consumption of the optical fibers 104 through which the lightpath is set from $v_i$ to $v_j$.

Figure 7:
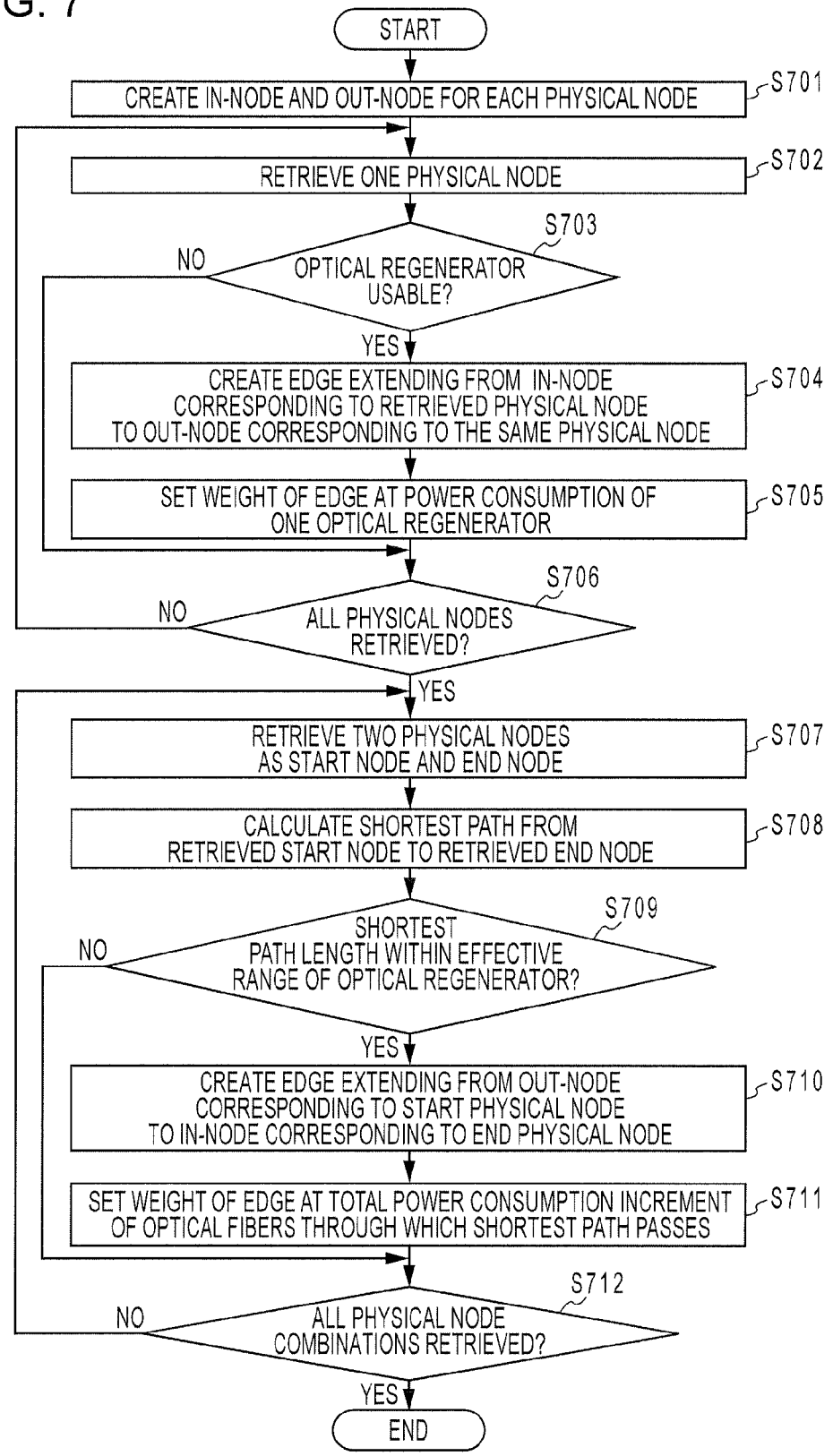
FIG. 7 is a diagram illustrating an example of an operational flowchart for creating a new lightpath candidate layer, according to an embodiment.

FIG. 7 is a diagram illustrating an example of an operational flowchart for creating a new lightpath candidate layer, according to an embodiment. A creation process executed by the new lightpath candidate layer creating unit 502 will be described. As many lightpath candidate layers as the number of wavelengths used on the optical network are created.

In operation S701, the new lightpath candidate layer creating unit 502 creates an in-node and an out-node for each of physical nodes, based on the information stored in the physical topology information storage unit 211.

In operation S702, the new lightpath candidate layer creating unit 502 retrieves one physical node to be processed.

In operation S703, it is determined whether the optical regenerator 102a is allowed to be used in the retrieved physical node. When it is determined that the use of optical regenerator 102a is allowed (YES in operation S703), the new lightpath candidate layer creating unit 502 creates an edge that extends from the in-node corresponding to the retrieved physical node to the out-node corresponding to the retrieved physical node (in operation S704).

In operation S705, the new lightpath candidate layer creating unit 502 sets a weight of the edge at the power consumption of one optical regenerator 102a.

Meanwhile, when it is determined that the use of the optical regenerator 102a is not allowed (NO in operation S703), the processing proceeds to operation S706.

In operation S706, it is determined whether all physical nodes have been retrieved or not. When all the physical nodes have not been retrieved (NO in operation S706), the processing returns to step S702. When all the physical nodes have been retrieved (Yes in operation S706), the processing proceeds to next operation S707.

In operation S707, the new lightpath candidate layer creating unit 502 retrieves two physical nodes as a start node and an end node.

In operation S708, the new lightpath candidate layer creating unit 502 calculates a shortest path from the retrieved start node to the retrieved end node.

In operation S709, it is determined whether the length of the calculated shortest path is within the effective range of the optical regenerator 102a or not. When the length of the calculated shortest path is within the effective range (YES in operation S709), the new lightpath candidate layer creating unit 502 creates an edge that extends from an out-node corresponding to the start physical node to an in-node corresponding to the end physical node (in operation S710).

In operation S711, the new lightpath candidate layer creating unit 502 sets a weight of the edge at the total power consumption increment of the optical fibers 104 through which the calculated shortest path passes.

Meanwhile, when the length of the calculated shortest path is not within the effective range (NO in operation S709), the processing proceeds to operation S712.

In operation S712, it is determined whether all physical node combinations have been retrieved or not. When all the physical node combinations have not been retrieved (NO in operation S712), the processing returns to operation S707. Meanwhile, when all the physical node combinations have been retrieved (YES in operation S712), the processing is terminated.

(Method of Interconnecting Layers)

Edges interconnecting layers may be created, for example, by one of procedures (1) and (2) described below.

(1) For each wavelength identifier w∈W, a first edge extending from $v^{N,w}_{i,in}$ to $v^E_{i,in}$ and a second edge extending from $v^E_{i,out}$ to $v^{N,w}_{i,out}$ are created. Here, a weight of each of the first and second edges is set at the minimum value ϵ.

(2) For each node $v_i$ included in $V_{oxc}$, an edge extending from $v^E_{i,in}$ to $v^{N,w}_{i,out}$ is created for each wavelength w included in all the wavelengths. Further, for each wavelength x other than the wavelength w, an edge extending from $v^{N,w}_{i,in}$ to $v^{N,x}_{i,out}$ and an edge extending from $v^{N,w}_{i,in}$ to $v^E_{i,out}$ are created. Here, a weight of the each created edge is set at a value obtained by the equation $M_{router}^i(B+b) - M_{router}^i(B)$.

Figure 8A:
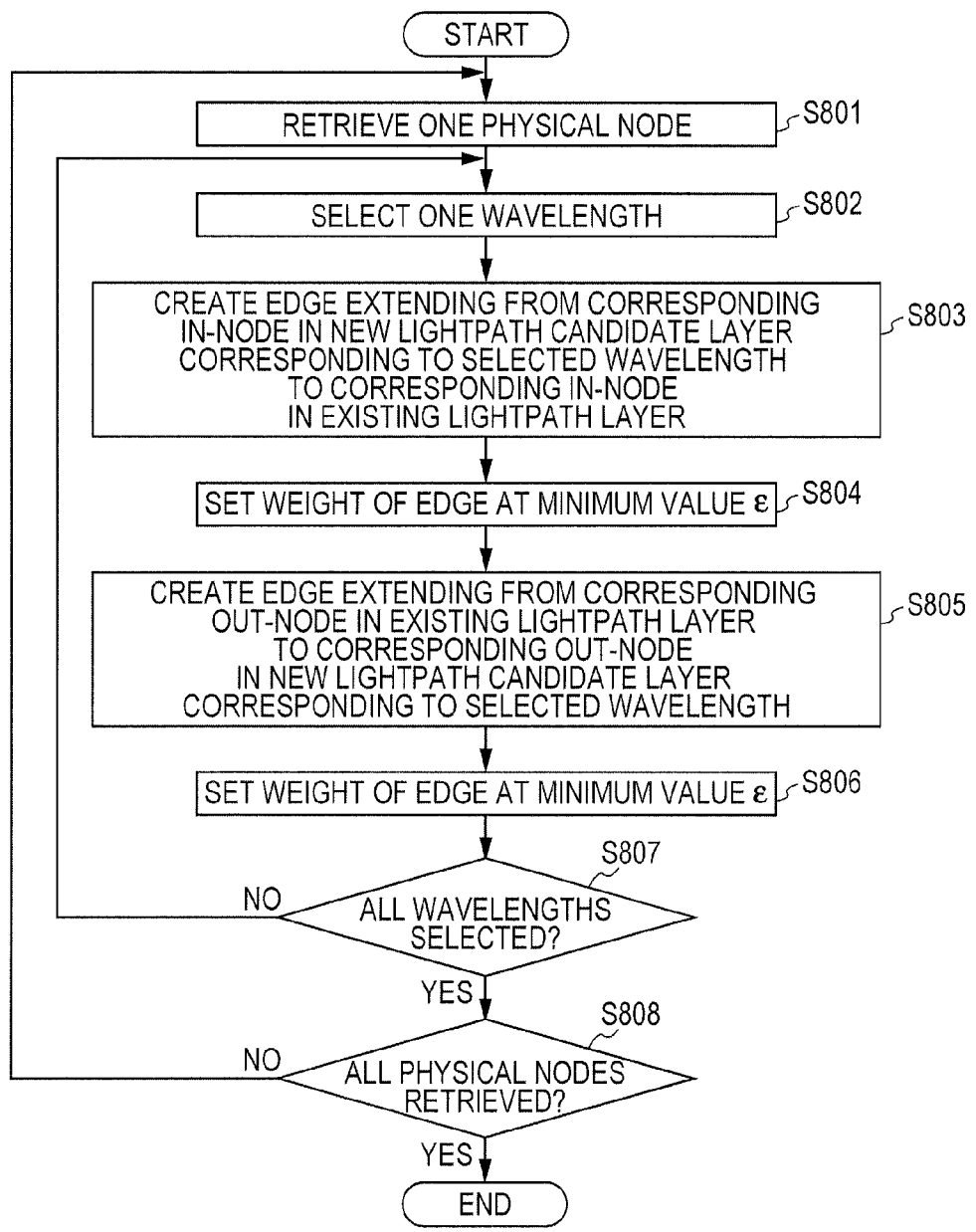
FIG. 8A is a diagram illustrating an example of an operational flowchart for creating a connection between layers, according to an embodiment.

FIG. 8A is a diagram illustrating an example of an operational flowchart for creating a connection between layers, according to an embodiment.

FIG. 8A illustrates the above mentioned procedure (1) that is executed, for example, by the inter-layer connecting unit 503.

In operation S801, the inter-layer connecting unit 503 retrieves one physical node.

In operation S802, the inter-layer connecting unit 503 selects one wavelength for the retrieved physical node.

In operation S803, the inter-layer connecting unit 503 creates an edge that extends from an in-node that corresponds to the retrieved physical node and is presented in the new lightpath candidate layer corresponding to the selected wavelength, to an in-node that corresponds to the retrieved physical node and is represented in the existing lightpath layer.

In operation S804, the inter-layer connecting unit 503 sets a weight of the created edge at the minimum value ϵ.

In operation S805, the inter-layer connecting unit 503 creates an edge that extends from an out-node that corresponds to the retrieved physical node and is represented in the existing lightpath layer, to an out-node that corresponds to the retrieved physical node and is represented in the new lightpath candidate layer corresponding to the selected wavelength.

In operation S806, the inter-layer connecting unit 503 sets a weight of the created edge at the minimum value E.

In operation S807, it is determined whether all wavelengths have been selected or not. When all wavelengths have not been selected yet (NO in operation S807), the processing returns to operation S802. Meanwhile, when all the wavelengths have been selected (YES in operation S807), it is determined whether all physical nodes have been retrieved (in operation S808). When all the physical nodes have not been retrieved yet (NO in operation S808), the processing returns to operation S801. Meanwhile, when all the physical nodes have been retrieved (YES in operation S808), the processing is terminated.

Figure 8B:
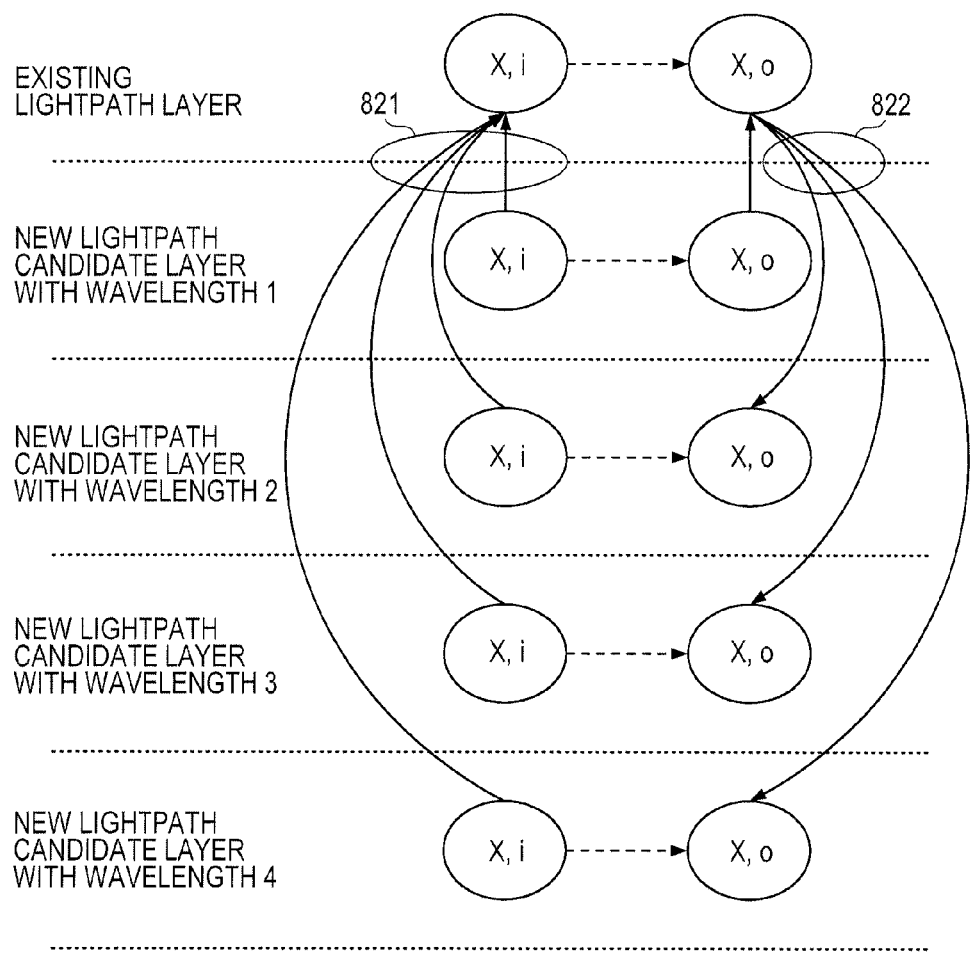
FIG. 8B is a diagram illustrating an example of inter-layer connection states, according to an embodiment.

FIG. 8B is a diagram illustrating an example of inter-layer connection states, according to an embodiment. FIG. 8B illustrates an example of the inter-layer connection states that result from performing the creation procedure illustrated in FIG. 8A. In FIG. 8B, nodes and edges interconnecting layers on an auxiliary graph are depicted for only one physical node vx. Each solid line in the drawing indicates an edge that interconnects layers. As illustrated in FIG. 8B, inter-layer edges include edges 821 extending from in-nodes in a plurality of new lightpath candidate layers to the in-node in the existing lightpath layer and edges 822 extending from the out-node in the existing lightpath layer to out-nodes in the plurality of new lightpath candidate layers.

Figure 8C:
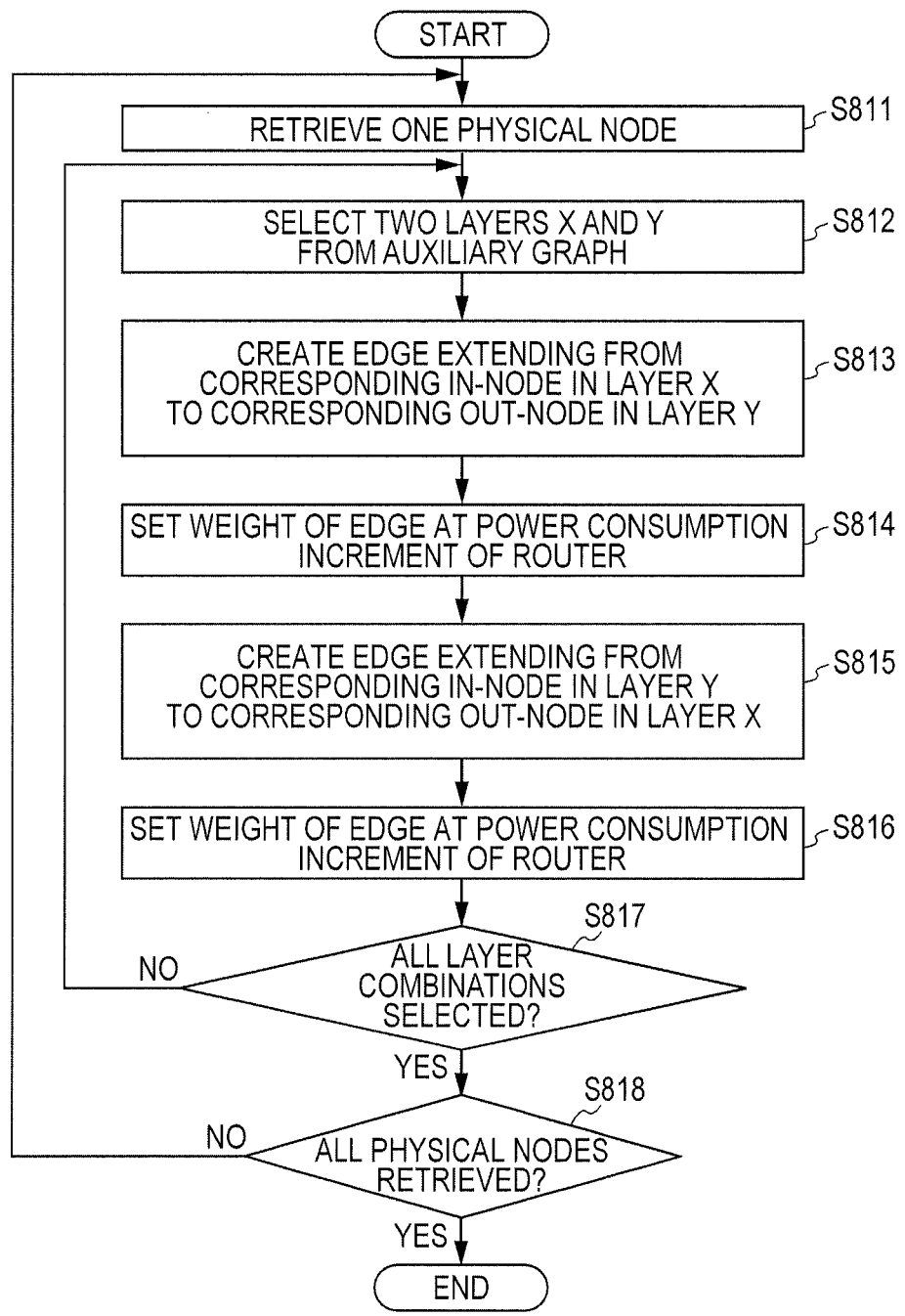
FIG. 8C is a diagram illustrating an example of an operational flowchart for creating a connection between layers, according to an embodiment.

FIG. 8C is a diagram illustrating an example of an operational flowchart for creating a connection between layers, according to an embodiment. FIG. 8C illustrates the above mentioned procedure (2) that is executed, for example, by the inter-layer connecting unit 503.

In operation S811, the inter-layer connecting unit 503 retrieves one physical node.

In operation S812, the inter-layer connecting unit 503 selects two layers from the auxiliary graph, and the selected two layers are represented by x and y, respectively.

In operation S813, the inter-layer connecting unit 503 creates an edge extending from an in-node that corresponds to the retrieved physical node and is represented in the layer x, to an out-node that corresponds to the retrieved physical node and is represented in the layer y.

In operation S814, the inter-layer connecting unit 503 sets a weight of the created edge at the increment in the power consumption of the router 103.

In operation S815, the inter-layer connecting unit 503 creates an edge extending from an in-node that corresponds to the retrieved physical node and is represented in the layer y, to an out-node that corresponds to the retrieved physical node and is represented in the layer x.

In operation S816, the inter-layer connecting unit 503 sets a weight of the created edge at the increment in power consumption of the router 103.

In operation S817, it is determined whether all layer combinations have been selected or not. When all the layer combinations have not been selected yet (NO in operation S817), the processing returns to operation S812. Meanwhile, when all the layer combinations have been selected (YES in operation S817), it is determined whether all physical nodes have been retrieved or not (in operation S818). When all the physical nodes have not been retrieved yet (NO in operation S818), the processing returns to operation S811. Meanwhile, when all the physical nodes have been retrieved (YES in operation S818), the processing is terminated.

(Example of Creating an Auxiliary Graph)

An example of an auxiliary graph will be described in accordance with a creation procedure.

Figures 9A, 9B:
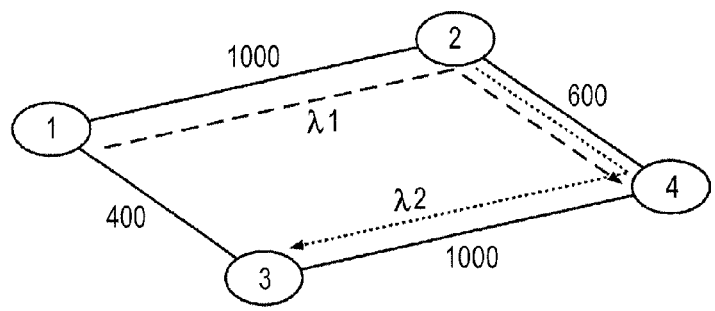
FIG. 9A is a diagram illustrating an example of a state of a network for which an auxiliary graph is to be created, according to an embodiment.
FIG. 9B is a diagram illustrating an example of lightpath information, according to an embodiment.

FIG. 9A is a diagram illustrating an example of a state of a network for which an auxiliary graph is to be created, according to an embodiment. The network in FIG. 9A includes four nodes, and numerals described beside links connecting the nodes indicate the lengths of fibers used for connecting the nodes.

FIG. 9B is a diagram illustrating an example of lightpath information, according to an embodiment. In the case, up to two wavelengths are allowed to be multiplexed on one optical fiber. A lightpath is set by using wavelength 1 (λ1) between physical node 1 (start node) and physical node 4 (end node) along a path of physical nodes 1-2-4. A lightpath is also set by using wavelength 2 (λ2) between physical node 2 (start node) and physical node 3 (end node) along a path of physical nodes 2-4-3. The available bandwidth of the lightpath between physical nodes 1 and 4 is 5 Gbps, and the available bandwidth of the lightpath between nodes 2 and 3 is 7 Gbps. It is also assumed that the effective range $R_{regen}$ of the optical regenerator 102a is 1500, and the effective range $R_{amp}$ of the optical amplifier is 80.

FIG. 10 is a diagram illustrating an example of power model information, according to an embodiment. In FIG. 10 illustrates a power model storage unit 214 that stores information on a power model of router 103, information on a power model of optical regenerator 102a, and information on a power model of an optical amplifier disposed in the optical fiber 104. The power model information of the router 103 includes fixed power consumption and linear power consumption increment that corresponds to communication speed. The power model information of the optical regenerator 102a includes the power consumption of one optical regenerator 102a, and the power model information of the optical amplifier includes the power consumption of one optical amplifier.

FIG. 11 is a diagram illustrating an example of traffic information, according to an embodiment. FIG. 11 illustrates a traffic information storage unit 213 that stores traffic information, for example, indicating that newly generated traffic uses a lightpath from physical node 2 (start node) to physical node 4 (end node) and the bandwidth to be used is 4 Gbps.

A lightpath used by the newly generated traffic and an example of calculating a path will be described. Here, it is assumed that each physical node has, for each wavelength, one optical regenerator 102a dedicated to the each wavelength. That is, as illustrated in FIG. 9A, the optical regenerator 102a that is provided for physical node 2 and dedicated to wavelength 1 is being used, and the optical regenerator 102a that is provided for physical node 4 and dedicated to wavelength 2 is being used. However, whether or not an optical regenerator 102a is dedicated to each of wavelengths does not limit an auxiliary graph creation method, and the auxiliary graph creation method described above may be used for creating an auxiliary graph even if the optical regenerator 102a does not have wavelength dependency.

Figures 12, 13:
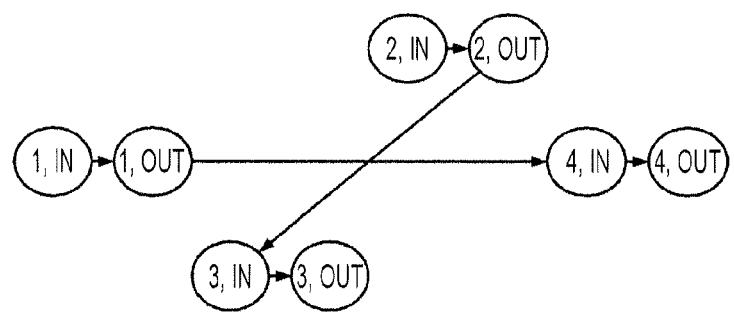
FIG. 12 is a diagram illustrating an example of a result of creating an existing lightpath layer, according to an embodiment.
FIG. 13 is a diagram illustrating an example of information on edges in an existing lightpath layer, according to an embodiment.

FIG. 12 is a diagram illustrating an example of a result of creating an existing lightpath layer, according to an embodiment. First, a pair of in-node and out-node that corresponds to each of physical nodes is created according to the creation procedure illustrated in FIG. 6. Since, in this example, a lightpath from physical node 1 to physical node 4 and another lightpath from physical node 2 to physical node 3 are being set, an edge extending from an out-node corresponding to physical node 1 ("1, OUT" in FIG. 12) to an in-node corresponding to physical node 4 ("4, IN" in FIG. 12) and an edge from an out-node corresponding to physical node 2 ("2, OUT" in FIG. 12) to an in-node corresponding to physical node 3 ("3, IN" in FIG. 12) are created.

FIG. 13 is a diagram illustrating an example of information on edges in an existing lightpath layer, according to an embodiment. The bandwidth of traffic to be routed is 4 Gbps as illustrated in FIG. 11, and the power consumption of the router 103 is linearly increased with respect to the amount of traffic as illustrated in FIG. 10 where the amount of increase in 1 Gbps is 20 W. Accordingly, the weight of the edge from the in-node corresponding to physical node 1 to the out-node corresponding to physical node 1 is 80 (20×4). Whereas, the weights of the edges corresponding to the existing lightpath from physical node 1 to physical node 4 and to the existing lightpath from physical node 2 to physical node 3 are each the minimum value ε.

Figure 14A:
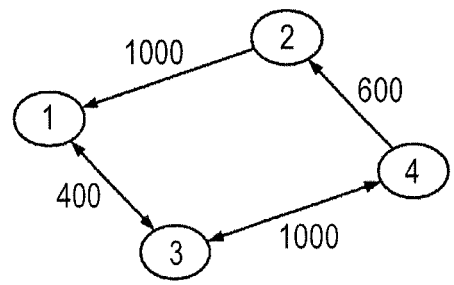
FIGS. 14A and 14B are diagrams illustrating a connection relation between nodes for each of wavelengths, according to an embodiment.
Figure 14B:
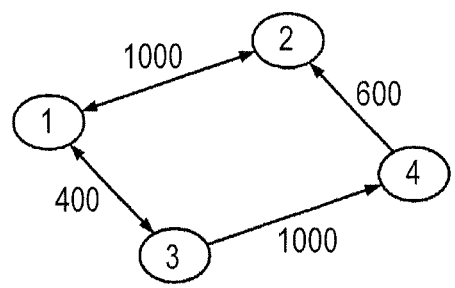

FIGS. 14A and 14B are diagrams each illustrating a connection relation between nodes for a wavelength in an auxiliary graph, according to an embodiment. FIGS. 14A and 14B indicate the connection relations for wavelengths 1 and 2, respectively. When focusing on wavelength 1 (in FIG. 14A), it is found that there are no direct connection relations from physical node 1 to physical node 2 and from physical node 2 to physical node 4. This is because, as illustrated in FIG. 9A, the lightpath from physical node 1 through physical node 2 to physical node 4 has been already set. When focusing on wavelength 2 (in FIG. 14B), it is found that there are no direct connection relations from physical node 2 to physical node 4 and from physical node 4 to physical node 3. This is because, as illustrated in FIG. 9A, the lightpath from physical node 2 through physical node 4 to physical node 3 has been already set. Thus, when links being used by lightpaths are removed from the connection relations in terms of the physical topology, connection relations in the auxiliary graph may be obtained for each wavelength as illustrated in FIGS. 14A and 14B.

FIG. 15 is a diagram illustrating an example of a table that represents shortest paths among all physical nodes in association with the lengths of the shortest paths, according to an embodiment. As for each of wavelengths, shortest paths among all physical nodes are obtained from the connection relation chart illustrated in FIGS. 14A and 14B, and two physical nodes that are connected by a shortest path having a path length equal to or less than the effective range $R_{regen}$ of the optical regenerator 102a (which is 1500) are extracted. FIG. 15 illustrates shortest paths for wavelength 1 as an exemplary wavelength. For example, in FIG. 15, a path 1-3-4-2 forms a shortest path for the direct lightpath from physical node 1 (start node) to physical node 2 (end node). Since it is impossible to create an edge in association with lightpaths having a path length exceeding the effective range $R_{regen}$ (=1500) of the optical regenerator 102a, "IMPOSSIBLE" is written in "EDGE CREATION" column of FIG. 15 for these lightpaths each having a path length exceeding the effective range $R_{regen}$.

Figure 16A:
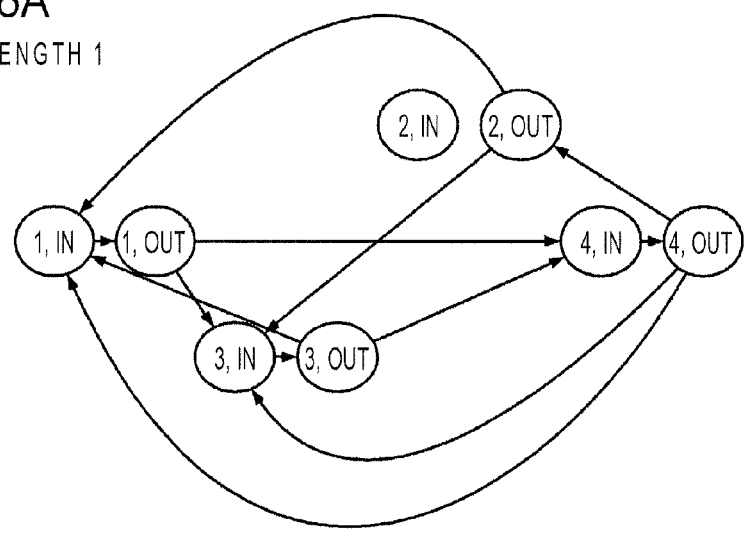
FIGS. 16A and 16B are diagrams each illustrating an example of a new lightpath candidate layer for a wavelength, according to an embodiment.
Figure 16B:
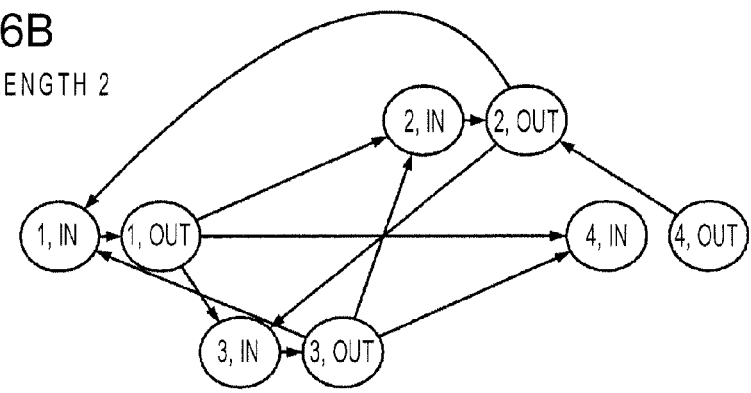

FIGS. 16A and 16B are diagrams each illustrating an example of a new lightpath candidate layer for a wavelength, according to an embodiment. FIGS. 16A and 16B each illustrate an example of a new lightpath candidate layer that is created based on a table, for example, as illustrated in FIG. 15. As illustrated in FIGS. 16A, 16B, an edge is created from an out-node corresponding to a start physical node to an in-node corresponding to an end physical node when the shortest path length between the start node and the end node is equal to or less than the effective range $R_{regen}$ of the optical regenerator 102a (that is, when the optical regenerator 102a is not needed between the start node and the end node).

Further, an edge is created from an in-node corresponding to a physical node that is allowed to use the optical regenerator 102a, to an out-node of the same physical node. For example, in FIG. 9A, since the path length of the lightpath using wavelength 1 is 1600, physical node 2 is already using the optical regenerator 102a dedicated to wavelength 1. Accordingly, for wavelength 1, no edge is created from an in-node corresponding to physical node 2 to an out-node corresponding to the same physical node 2 as illustrated in FIG. 16A. However, since physical node 1 includes an available optical regenerator 102a dedicated to wavelength 1, an edge is created from an in-node corresponding to physical node 1 to an out-node corresponding to the same physical node 1 as illustrated in FIG. 16A.

FIG. 17 is a diagram illustrating an example of a table that represents information on a new lightpath candidate layer, according to an embodiment. FIG. 17 illustrates information on a new lightpath candidate layer corresponding to wavelength 1 as an exemplary wavelength. For example, the table indicates that the edge extending from an in-node corresponding to physical node 1 ("1, IN" in FIG. 17) to an out-node corresponding to physical node 1 ("1, OUT" in FIG. 17) has a weight represented by an increment in the power consumption of the optical regenerator 102a. In the case, the weight is 50 as indicated in the power model information stored in the power model storage unit 214. The table also indicates that a lightpath may be set for an edge extending from the out-node corresponding to physical node 1 ("1, OUT" in FIG. 17) to the in-node corresponding to physical node 4 ("4, IN" in FIG. 17) by using a path 1-3-4 without the optical regenerator 102a. The weight of this edge is obtained by adding first and second power consumptions where the first power consumption is the total of power consumptions of optical amplifiers disposed in the optical fiber 104 that has an optical fiber length of 400 and extends from physical node 1 to physical node 3 and the second power consumption is the total of power consumptions of optical amplifiers disposed in the optical fiber 104 that has an optical fiber length of 1000 and extends from physical node 3 to physical node 4. That is, the weight of the edge is calculated, using equation (2), as follows:

$$5 \times \left(\left\lfloor \frac{400}{80} \right\rfloor + 2\right) + 5 \times \left(\left\lfloor \frac{1000}{80} \right\rfloor + 2\right) = 105$$

where $P_{amp}$ is 5 as indicated in FIG. 10.

Figure 18:
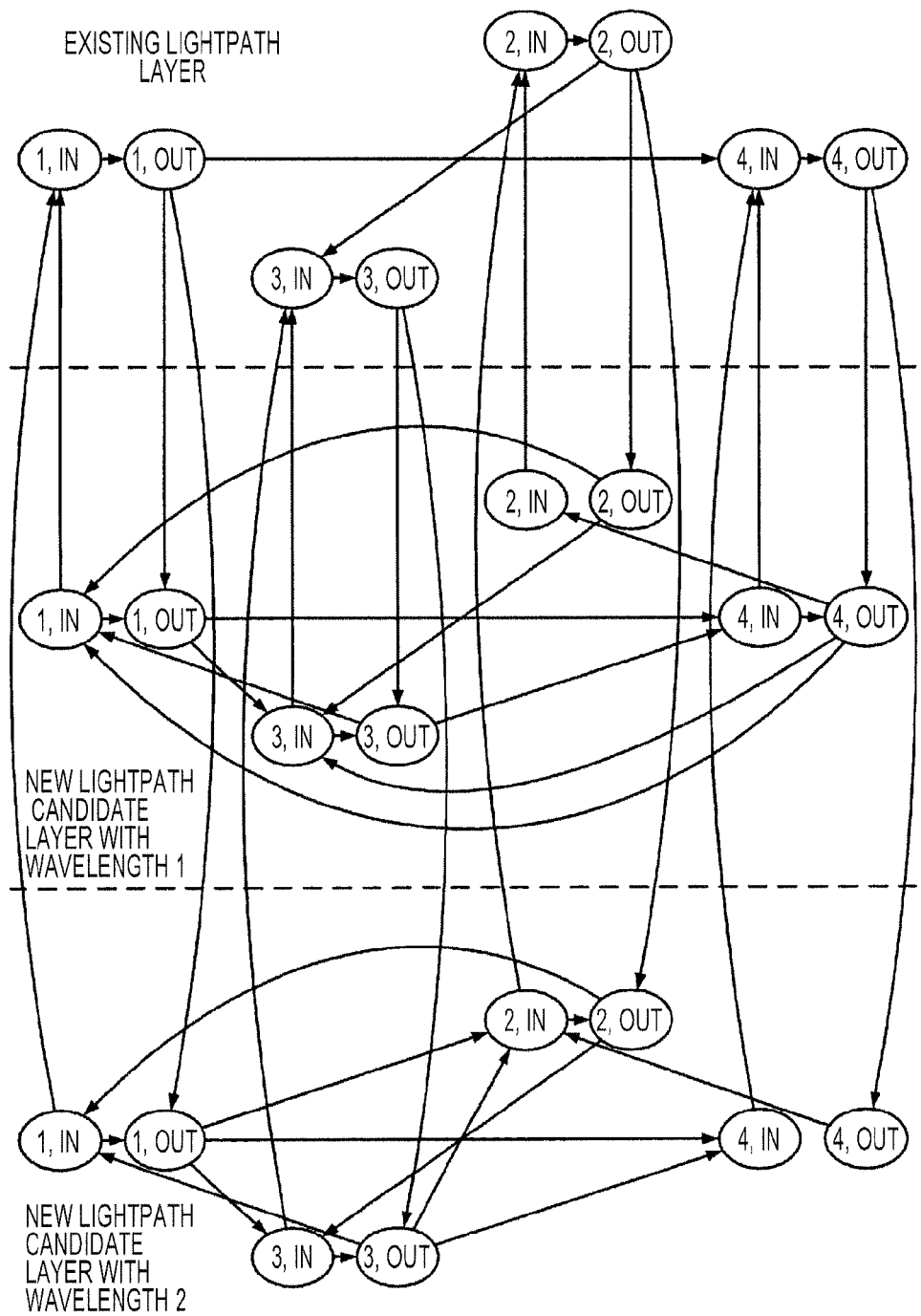
FIG. 18 is a diagram illustrating an example of an auxiliary graph, according to an embodiment.

FIG. 18 is a diagram illustrating an example of an auxiliary graph, according to an embodiment. FIG. 18 illustrates an example of an auxiliary graph in which layers are interconnected by an inter-layer connection procedure illustrated in FIG. 8A. The created auxiliary graph includes edges extending from in-nodes in each of new lightpath candidate layers to the corresponding in-nodes in the existing lightpath layer and edges extending from the out-nodes in the existing lightpath layer to the corresponding out-node in each of new lightpath candidate layers corresponding to all the wavelengths.

(Route Calculation on an Auxiliary Graph)

Assuming that traffic that has arrived is for communication from $v_s \in V_{router}$ to $v_d \in V_{router}$ ($s \neq d$) with bandwidth b (bps), a path on which the increment in power consumption will become smallest (a minimum weight path) may be obtained by searching paths from node $v^E_{s,in}$ to node $v^E_{d,out}$ on the auxiliary graph, for example, using the Dijkstra's algorithm.

For example, regarding a path from physical node 2 to physical node 4, a minimum weight path from $v^E_{2,in}$ to $v^E_{4,out}$ is searched. After the minimum weight path has been obtained, new lightpaths to be set are then obtained by tracing the obtained path. That is, a new lightpath to be set is obtained by selecting a longest continuous path segments within a new lightpath candidate layer of the same wavelength, from the obtained minimum weight path on the auxiliary graph. This means that a new lightpath is to be set between the start and end nodes of the obtained longest continuous path segments.

Figure 19:
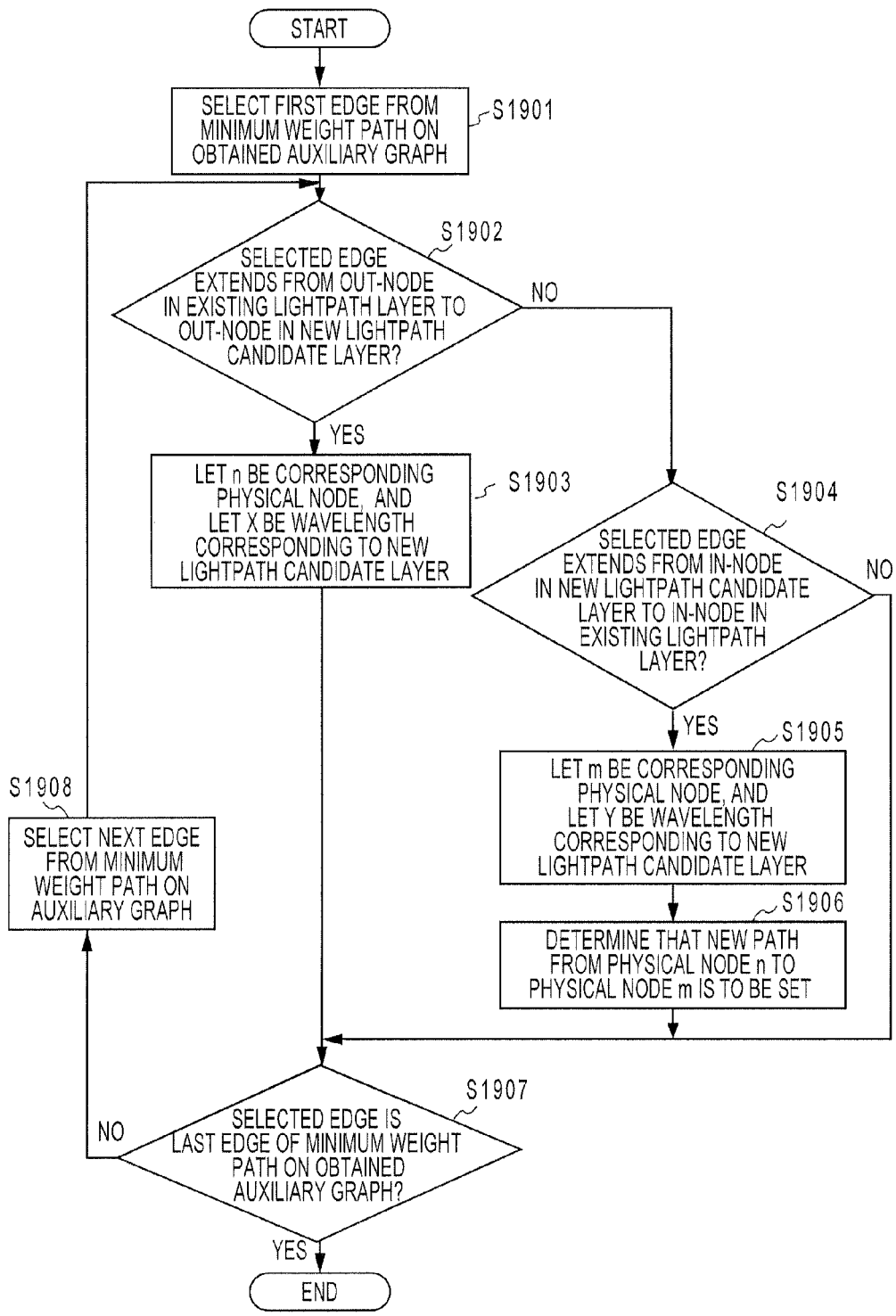
FIG. 19 is a diagram illustrating an example of an operational flowchart for obtaining a path of new lightpaths from an auxiliary graph, according to an embodiment.

FIG. 19 is a diagram illustrating an example of an operational flowchart for obtaining a path of new lightpaths from an auxiliary graph, according to an embodiment. FIG. 19 illustrates an example of an operational flowchart performed by the lightpath setting unit 203.

In operation S1901, the lightpath setting unit 203 selects, as a target edge to be processed, a first edge constituting the minimum weight path on the auxiliary graph obtained by the auxiliary graph creating unit 201.

In operation S1902, it is determined whether the selected edge is an edge extending from the out-node in the existing lightpath layer to an out-node in a new lightpath candidate layer.

When the selected edge is an edge extending from the out-node in the existing lightpath layer to an out-node in a new lightpath candidate layer (YES in operation S1902), in operation S1903, let n be the corresponding physical node and let x be the wavelength corresponding to the new lightpath candidate layer, and the processing proceeds to step S1907.

When the selected edge is not an edge extending from the out-node in the existing lightpath layer to an out-node in a new lightpath candidate layer (NO in operation S1902), in operation S1904, it is determined whether the selected edge is an edge extending from an in-node in a new lightpath candidate layer to the in-node in the existing lightpath layer.

When the selected edge is an edge extending from an in-node in a new lightpath candidate layer to the in-node in the existing lightpath layer (YES in operation S1904), in operation S1905, let m be the corresponding physical node and let y be the wavelength corresponding to the new lightpath candidate layer.

In operation S1906, the lightpath setting unit 203 determines that a new lightpath from physical node n to physical node m is to be set, and the processing proceeds to step S1907.

When the selected edge is not an edge from an in-node in a new lightpath candidate layer to the in-node in the existing lightpath layer (NO in operation S1904), the processing proceeds to step S1907.

In operation S1907, it is determined whether the selected edge is the last edge constituting the minimum weight path on the auxiliary graph.

When the selected target edge is the last edge of the minimum weight path on the auxiliary graph (YES in operation S1907), the processing is terminated.

When the selected edge is not the last edge of the minimum weight path on the auxiliary graph (NO in operation S1907), in operation S1908, a next edge is selected from the minimum weight path on the auxiliary graph, and the processing returns to step S1902.

Figure 20A:
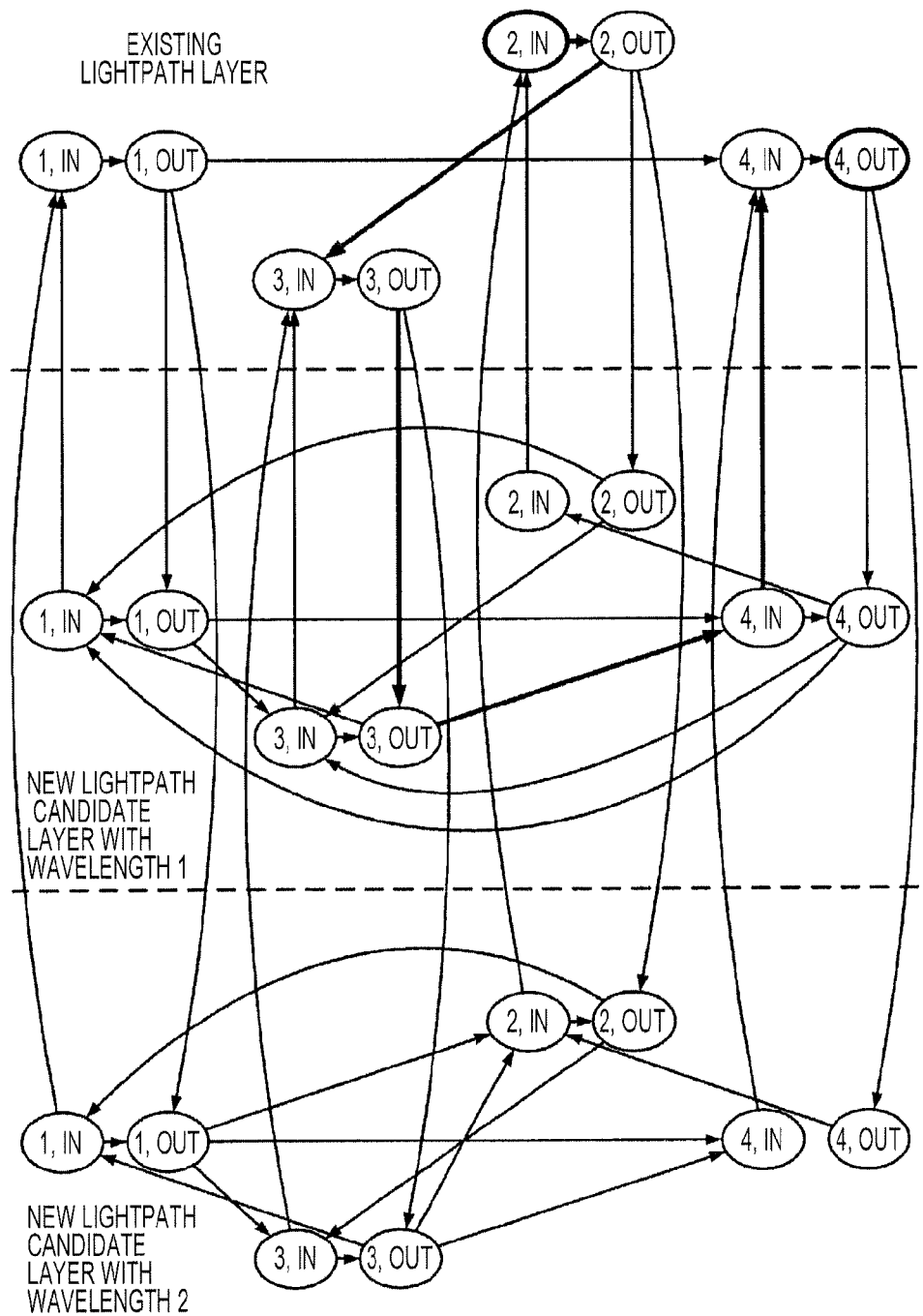
FIGS. 20A and 20B are diagrams each illustrating an example of a minimum weight path of lightpaths, according to an embodiment.

FIG. 20A is a diagram illustrating an example of a minimum weight path of lightpaths, according to an embodiment. FIG. 20A illustrates a path on which an increment in power consumption from physical node 2 to physical node 4 is minimized. The path indicated in bold in FIG. 20A is obtained as a minimum weight path. In this case, the minimum weight path is obtained, using, for example, the Dijkstra's algorithm, based on the weights assigned to the edges as illustrated in FIG. 13 and FIG. 17. FIG. 20A indicates that the minimum weight path is a path of $V^E_{2,in} \rightarrow V^E_{2,out} \rightarrow V^E_{3,in} \rightarrow V^E_{3,out} \rightarrow V^{N,1}_{3,out} \rightarrow V^{N,1}_{4,in} \rightarrow V^E_{4,in} \rightarrow V^E_{4,out}$. In the case, the longest continuous path segments that are included in the minimum weight path and represented in the new lightpath candidate layer having the same wavelength is a path segment of $v^{N,1}_{3,out} \rightarrow v^{N,1}_{4,in}$. This indicates that a new lightpath from physical node 3 to physical node 4 is to be set. A physical path through which the new lightpath is to be set and nodes in which an optical regenerator 102a is to be used may be determined by searching edges included in the obtained longest continuous path segments.

First, since there exists no edge that is represented in the new lightpath candidate layer and extends from an in-node to an out-node where the both in-node and out-node correspond to the same physical node, it is found that the use of the optical regenerator 102a is not required. Since the new lightpath passes through the path segment "$v^{N,1}_{3,out} \rightarrow c^{N,1}_{4,in}$", it is found that the new lightpath uses a path from physical node 3 to physical node 4. This is because the length of the edge from $v^{N,1}_{3,out}$ to $v^{N,1}_{4,in}$ is within the effective range $R_{regen}$ (=1500) of the optical regenerator 102a since the path length of a lightpath included in the route from physical node 3 to physical node 4 is 1000.

According to the minimum weight path obtained from the auxiliary graph, when new traffic of 4 Gbps is generated from physical node 2 to physical node 4, a lightpath from physical node 3 to physical node 4 is newly set using wavelength 1. The new traffic is then made to pass a lightpath from physical node 2 to physical node 3, as depicted in FIG. 13, that passes along the existing physical path "2→4→3" using wavelength 2. After that, the new traffic passes through the new lightpath that was newly set from physical node 3 to physical node 4 using wavelength 1. Here, a wavelength to be used is changed from wavelength 2 to wavelength 1 at physical node 3.

Figure 20B:
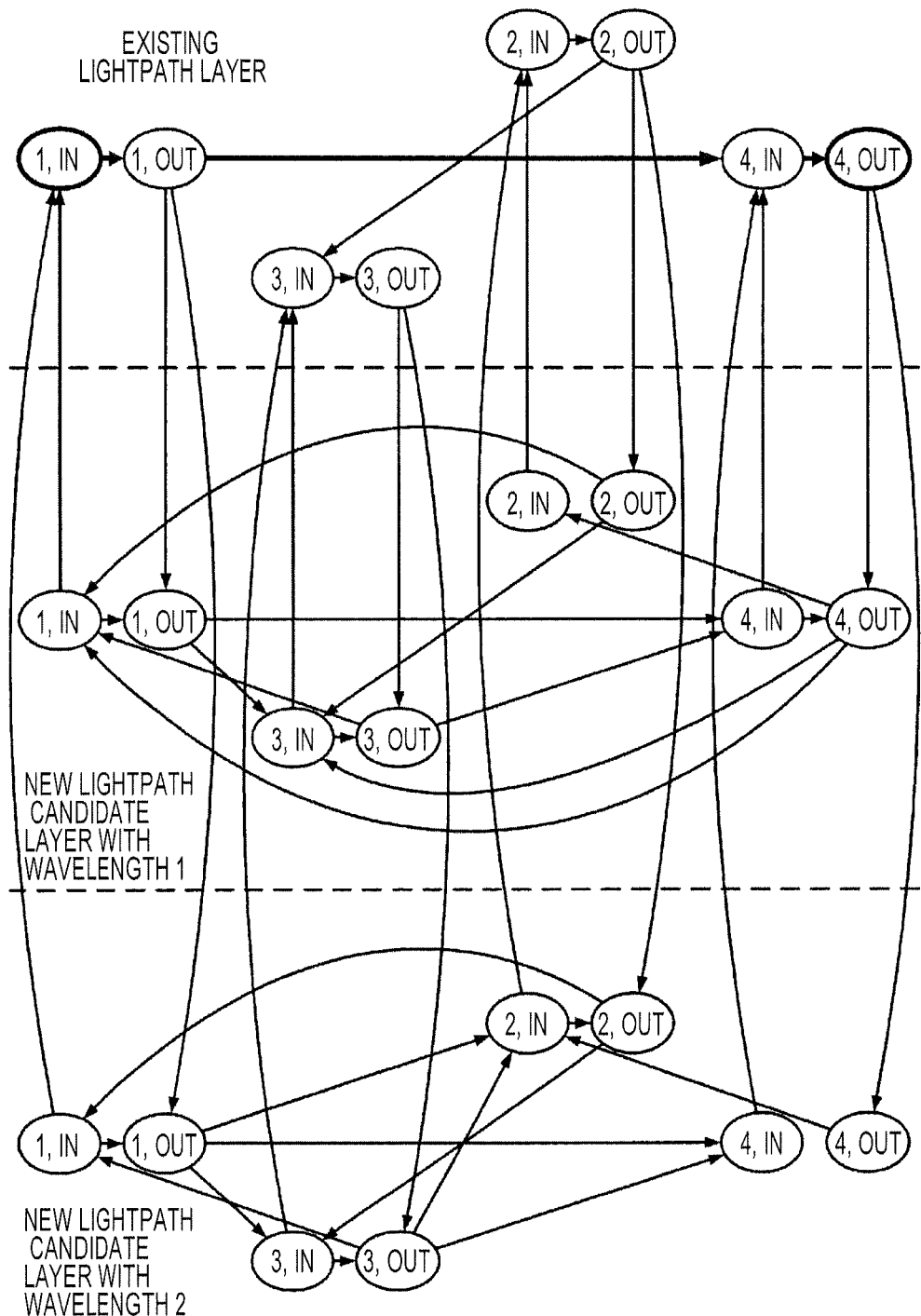

FIG. 20B is a diagram illustrating an example of a minimum weight path of lightpaths, according to an embodiment. FIG. 20B illustrates an example a minimum weight path, in the auxiliary graph of FIG. 18, that is obtained when new traffic of 4 Gbps is generated from physical node 1 to physical node 4. In FIG. 20B, the path indicated in bold is obtained as a minimum weight path on which the increment in power consumption is minimized. In this case, since the traffic passes through only edges in the existing lightpath layer, a new lightpath is not set.

According to the first embodiment described above, a new lightpath may be set in consideration of both the optical regenerator insertion constraint and an increment in the power consumption of an optical regenerator. In particular, a path on which an increment in power consumption is minimized may be calculated in consideration of both a case in which existing lightpaths are used and a case in which existing lightpaths and new lightpaths are combined. Further, since a case where an optical regenerator is used is taken into consideration, a minimum power consumption path may be obtained on a large-scale WDM network in a more practical manner. In addition, since a path of lightpaths is obtained effectively according to the minimum weight path on an auxiliary graph, processing may be carried out at higher speed than in a full search method, and lightpaths may thereby be efficiently set.

(Second Embodiment—Example of a Configuration by which an Auxiliary Graph is Updated to Calculate a Path)

Figure 21:
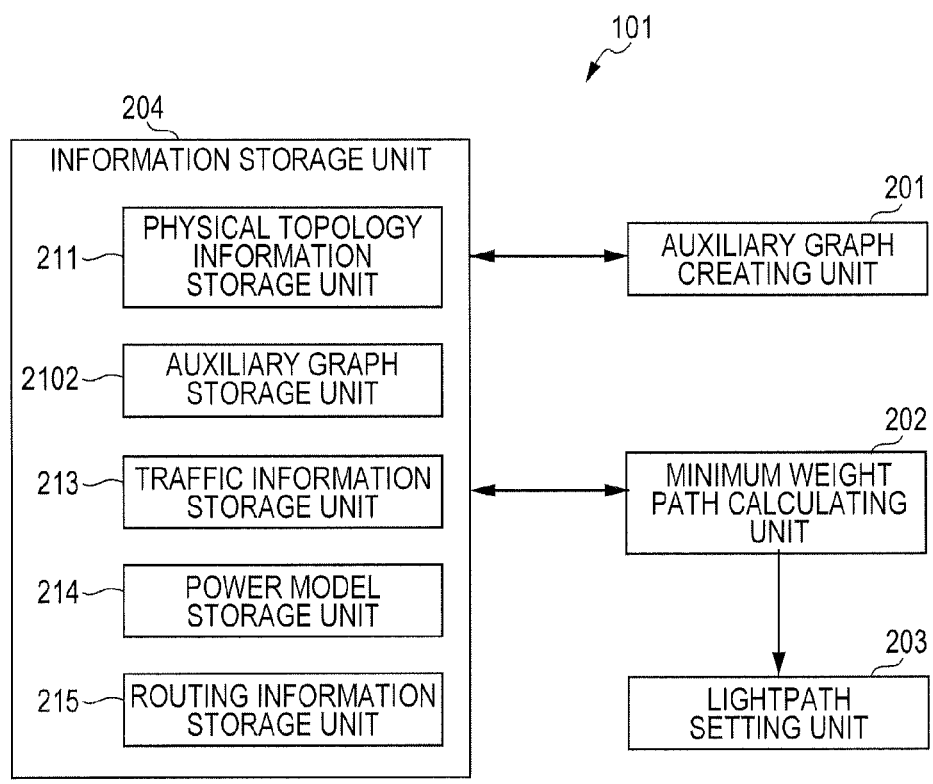
FIG. 21 is a diagram illustrating a configuration example of a network management apparatus, according to a second embodiment.

FIG. 21 is a diagram illustrating a configuration example of a network management apparatus, according to a second embodiment. In the second embodiment, description will be given of a configuration in which a path of lightpaths is calculated by updating the created auxiliary graph. As illustrated in FIG. 21, the network management apparatus may be configured to include the auxiliary graph creating unit 201, minimum weight path calculating unit 202, lightpath setting unit 203, and information storage unit 204, in a manner analogous to the first embodiment illustrated in FIG. 2. However, the second embodiment differs from the first embodiment in that an auxiliary graph storage unit 2102 is provided in the information storage unit 204. An auxiliary graph created by the auxiliary graph creating unit 201 is stored in the auxiliary graph storage unit 2102. After that, the stored auxiliary graph is read out and updated (changed) each time a new lightpath is set and the updated auxiliary graph is stored in the auxiliary graph storage unit 2102 again.

Figure 22:
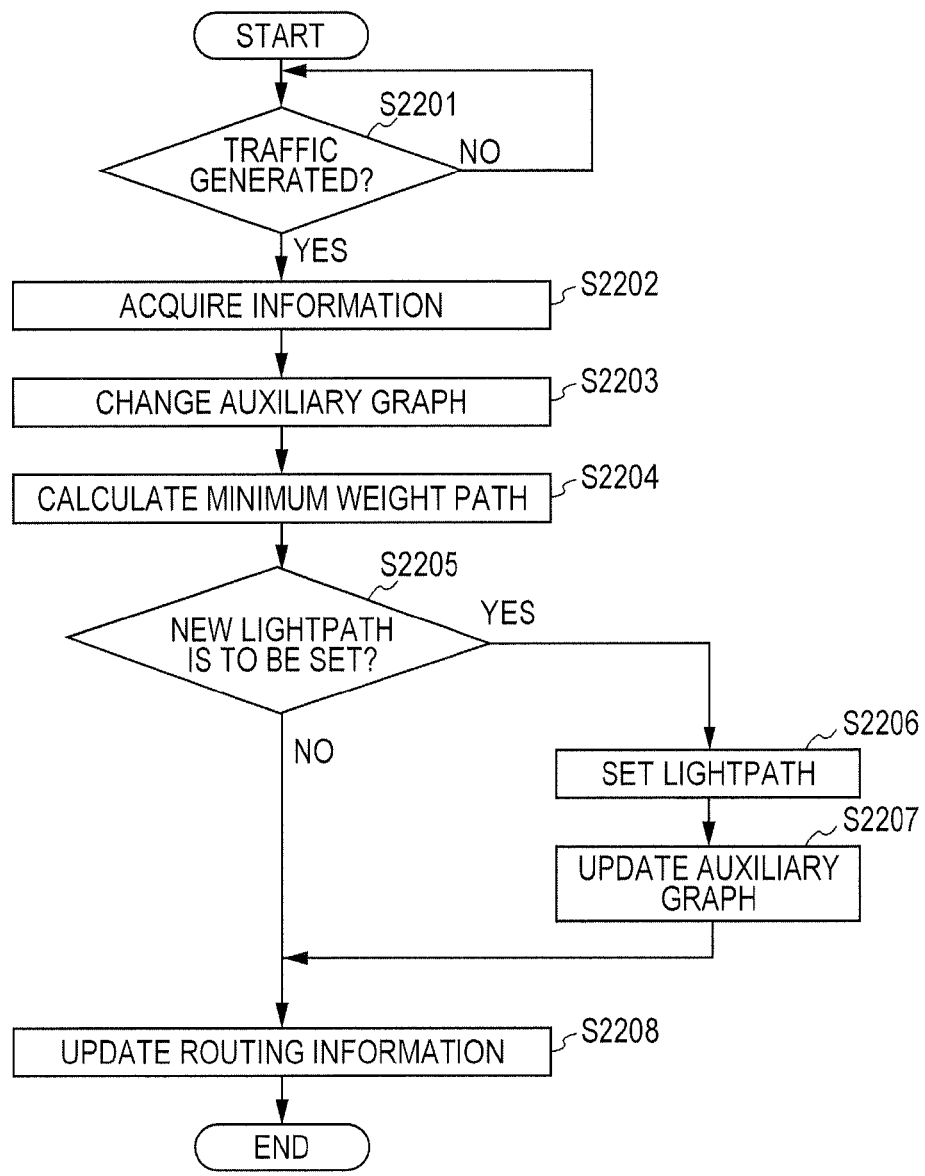
FIG. 22 is a diagram illustrating an example of an operational flowchart for calculating a path, according to a second embodiment.

FIG. 22 is a diagram illustrating an example of an operational flowchart for calculating a path, according to a second embodiment.

In operation S2201, generation of traffic is awaited (NO in operation step S2201).

When traffic is generated (YES in operation S2201), in operation S2202, the auxiliary graph creating unit 201 acquires power model information, routing information, traffic information, and the auxiliary graph, which are stored in the information storage unit 204.

In operation S2203, the auxiliary graph creating unit 201 changes the auxiliary graph according to the acquired information. In the changing of the auxiliary graph, for example, edges in the auxiliary graph are deleted and the weights of edges are changed in accordance with the generated traffic.

In operation S2204, the minimum weight path calculating unit 202 calculates a minimum weight path according to the changed auxiliary graph.

In operation S2205, the lightpath setting unit 203 determines, based on the calculated minimum weight path, whether a new lightpath is to be set for the generated traffic. When it is determined that a new lightpath is to be set (YES in operation S2205), in operation S2206, the lightpath setting unit 203 sets a lightpath for the generated traffic.

In operation S2207, the lightpath setting unit 203 updates the auxiliary graph and stores the updated auxiliary graph in the auxiliary graph storage unit 2102.

In operation S2208, the lightpath setting unit 203 updates the routing information stored in the routing information storage unit 215, and terminates the processing.

When it is determined that a new lightpath is not to be set (NO in operation S2205), the lightpath setting unit 203 updates the routing information related to the traffic (in operation S2208), and terminates the processing.

As described above, in the second embodiment, the created auxiliary graph is stored in the auxiliary graph storage unit 2102 instead of creating an auxiliary graph each time. In the first embodiment, the logical topology information is updated and an auxiliary graph is created each time. Meanwhile, in the second embodiment, the stored auxiliary graph is read out and updated.

The updating of the auxiliary graph described above will be outlined below. After the minimum weight path has been calculated on the auxiliary graph and a new lightpath to be set has been determined, the auxiliary graph is updated according to the setting of the lightpaths.

First, since edges corresponding to existing lightpaths that are unable to accommodate the generated traffic have been deleted at the time of creating an existing lightpath layer, the deleted edges are restored.

Next, the value of a bandwidth to be used by the generated traffic is subtracted from the value of an available bandwidth held as an attribute of the edge from an in-node corresponding to a physical node on the existing lightpath layer to an out-node corresponding to a different physical node on the existing lightpath layer. Furthermore, a new edge is created from an out-node that is represented in the existing lightpath layer and corresponds to the start physical node at which a new lightpath to be set starts, to an in-node that is represented in the existing lightpath layer and corresponds to the end physical node at which the new lightpath to be set terminates.

Finally, when an available optical regenerator 102*a* is removed, the edge corresponding to the removed optical regenerator 102*a* is deleted. As a result, regarding the wavelength to be used by the new lightpath, a link to be used by the new lightpath may become unavailable. Therefore, in the new lightpath candidate layer, an edge connecting two nodes corresponding physical nodes between which it would become difficult to set a lightpath without the optical regenerator 102*a* is deleted.

Figure 23:
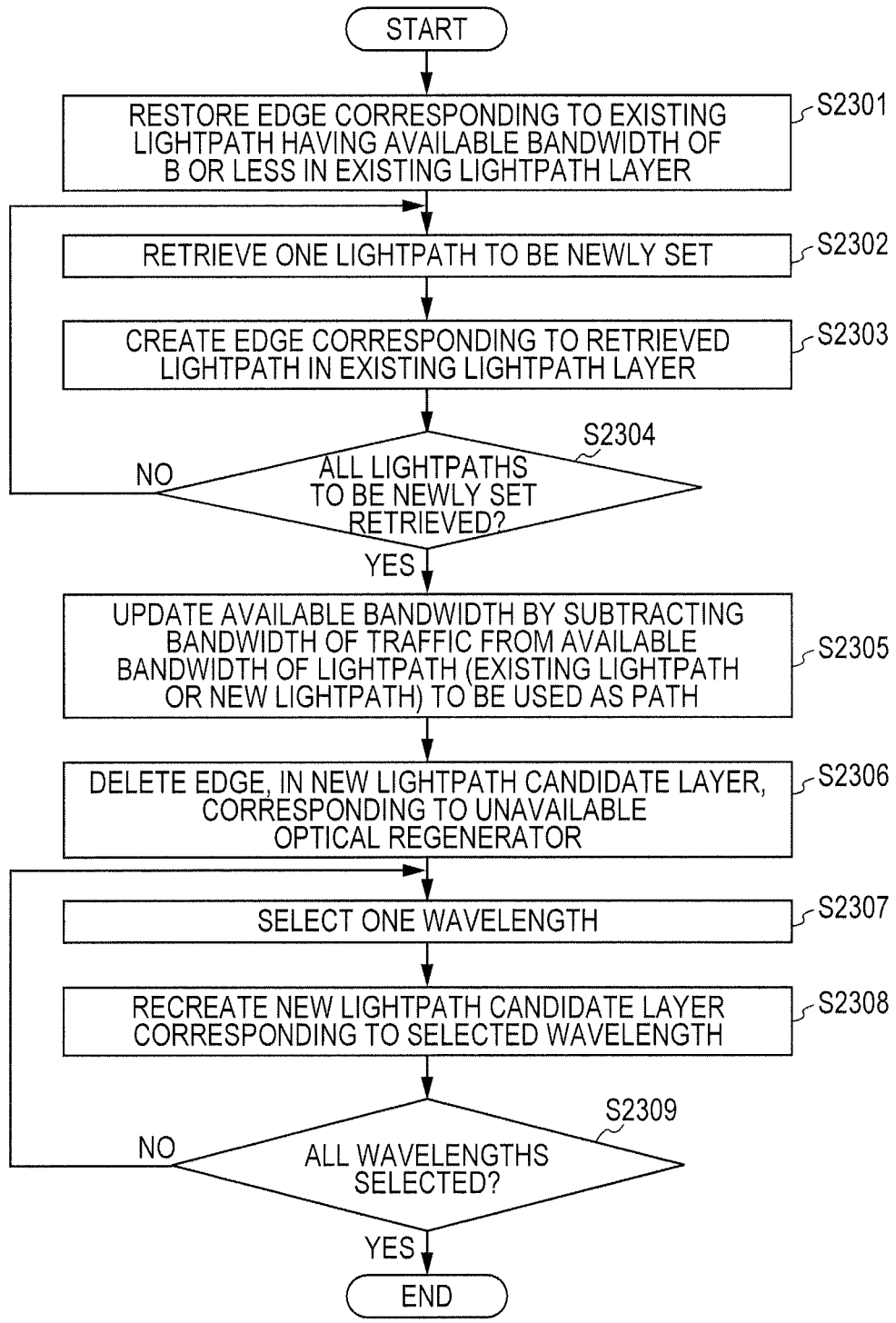
FIG. 23 is a diagram illustrating an example of an operational flowchart for updating an auxiliary graph, according to an embodiment.

FIG. 23 is a diagram illustrating an example of an operational flowchart for updating an auxiliary graph, according to an embodiment. Process for updating an auxiliary graph, which is executed by the auxiliary graph creating unit 201 in step S2207 in FIG. 22, will be described in detail.

In operation S2301, the auxiliary graph creating unit 201 restores an edge corresponding to the existing lightpath having an available bandwidth equal to or less than bandwidth b of the traffic, in the existing lightpath layer.

In operation S2302, the auxiliary graph creating unit 201 retrieves one lightpath to be newly set.

In operation S2303, the auxiliary graph creating unit 201 creates an edge corresponding to the new lightpath to be set, in the existing lightpath layer.

In operation S2304, it is determined whether all lightpaths to be newly set have been retrieved. When all the lightpaths to be newly set have not been retrieved (NO in operation S2304), the processing returns to operation S2302. Meanwhile, when all the lightpaths to be newly set have been retrieved (YES in operation S2304), the processing proceeds to a next process.

In operation S2305, the auxiliary graph creating unit 201 subtracts the bandwidth of the target traffic from an available bandwidth of a lightpath (which may be an existing lightpath or a new lightpath) to be used as a path, so as to update the available bandwidth.

In operation S2306, the auxiliary graph creating unit 201 deletes an edge that is in the new lightpath candidate layer and corresponds to an unavailable optical regenerator 102a.

In operation S 2307, the auxiliary graph creating unit 201 selects one wavelength.

In operation S2308, the auxiliary graph creating unit 201 recreates a new lightpath candidate layer corresponding to the selected wavelength.

In operation S2309, it is determined whether all wavelengths have been selected. When all the wavelengths have not been selected (NO in operation S2309), the processing returns to step S2307. When all the wavelengths have been selected (YES in operation S2309), the processing is terminated.

Figure 24:
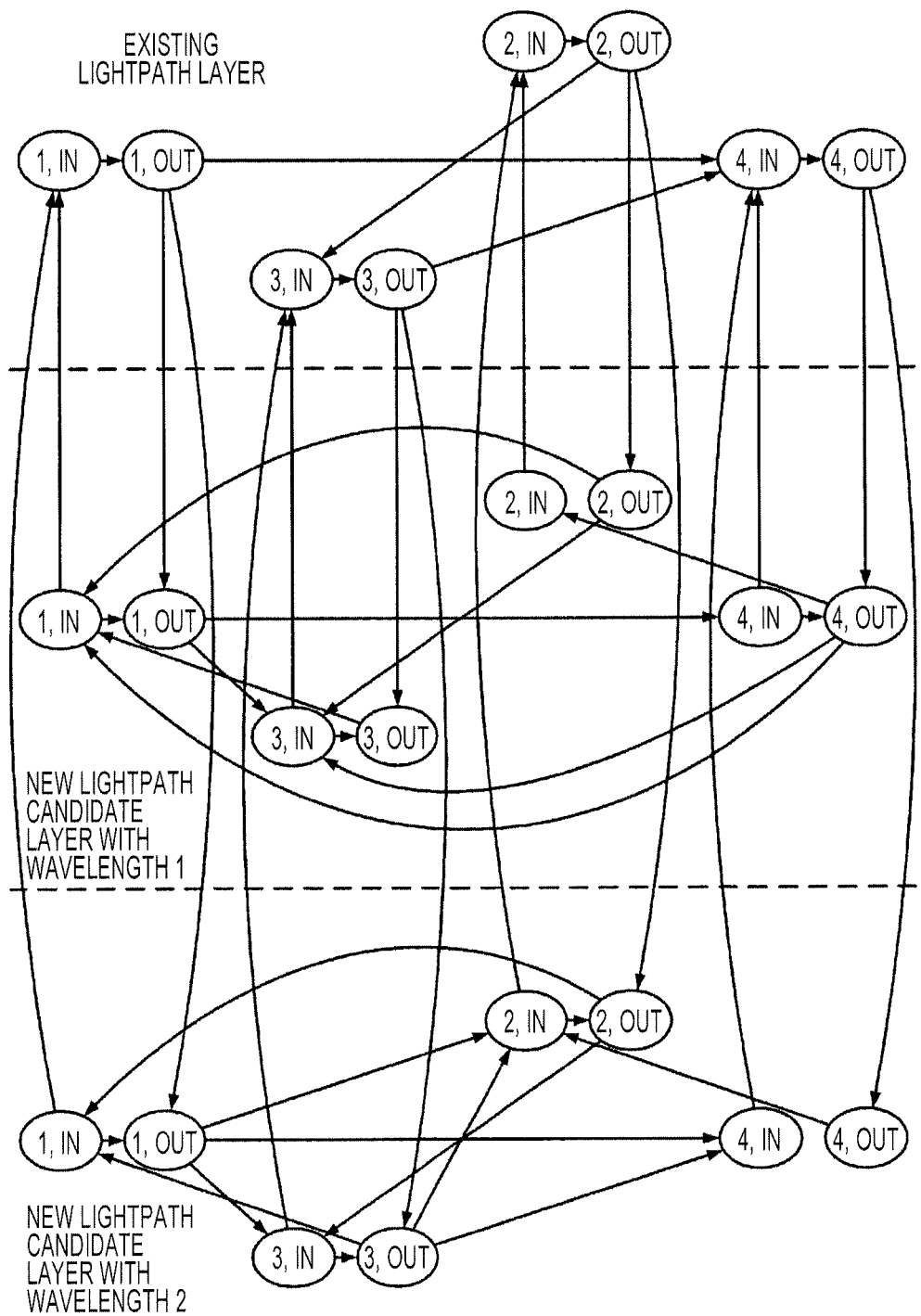
FIG. 24 is a diagram illustrating an example of an updated auxiliary graph, according to a second embodiment.

FIG. 24 is a diagram illustrating an example of an updated auxiliary graph, according to a second embodiment. When a minimum weight path is obtained according to the processing described above, for example as illustrated in FIG. 19, the auxiliary graph creating unit 201 performs processing described below.

(1) Since a new lightpath from physical node 3 to physical node 4 is to be set, an edge is created that extends from an out-node corresponding to physical node 3 in the existing lightpath layer to an in-node corresponding to physical node 4 in the existing lightpath layer.

(2) Since the lightpath from physical node 3 to physical node 4 uses wavelength 1 and uses a physical path from physical node 3 to physical node 4, out of the edges in the new lightpath candidate layer using wavelength 1, the edge from physical node 3 to physical node 4 becomes unavailable. Accordingly, an edge connecting two physical nodes between which it would become difficult to set a lightpath without the optical regenerator 102a, that is, an edge extending from the out-node corresponding to physical node 3 to the in-node corresponding to physical node 4 is deleted. Then, information on the updated auxiliary graph (equivalent to FIG. 24) is stored again in the auxiliary graph storage unit 2102 of the information storage unit 204.

In the second embodiment described above as well, a new lightpath may be set in consideration of both the optical regenerator insertion constraint and an increment in the power consumption of the optical regenerator 102a, in a manner similar to the first embodiment. In particular, a path on which an increment in power consumption is minimized may be calculated in consideration of both a case in which existing lightpaths are used and a case in which existing lightpaths and new lightpaths are combined. Further, since a case where an optical regenerator is used is taken into consideration, a minimum power consumption path may be obtained in a more practical manner in the case of a large-scale WDM network. In addition, since a path of lightpaths is obtained effectively according to the minimum weight path on an auxiliary graph, processing may be carried out at higher speed than in a full search method, and lightpaths may thereby be efficiently set. Furthermore, in the second embodiment, part of the auxiliary graph is changed and the changed auxiliary graph is used. As a result, the auxiliary graph is not created each time a lightpath is to be set, enabling no extra time and effort to be taken in creating the auxiliary graph.

(Third Embodiment—Example of Application to a Wavelength-convertible Optical Network)

In the first and second embodiments, the description has been given of a configuration by which a path that minimizes an increment in power consumption on an optical network including optical regenerators is obtained. In a third embodiment, description will be given of a configuration example in which a path minimizing an increment in power consumption is obtained on an optical network including physical nodes provided with wavelength converters for converting a wavelength.

In the first and second embodiments, an auxiliary graph including one existing lightpath layer and as many new lightpath candidate layers as the number of wavelengths is created and a desired solution is obtained by solving a minimum weight path problem on the auxiliary graph. Nodes on the auxiliary graph are connected using edges in the existing lightpath layer, edges in each new lightpath candidate layers, and edges that interconnect layers. In the third embodiment, the method of creating an inter-layer edge is changed so as to achieve lightpath setting using wavelength conversion.

Figure 25:
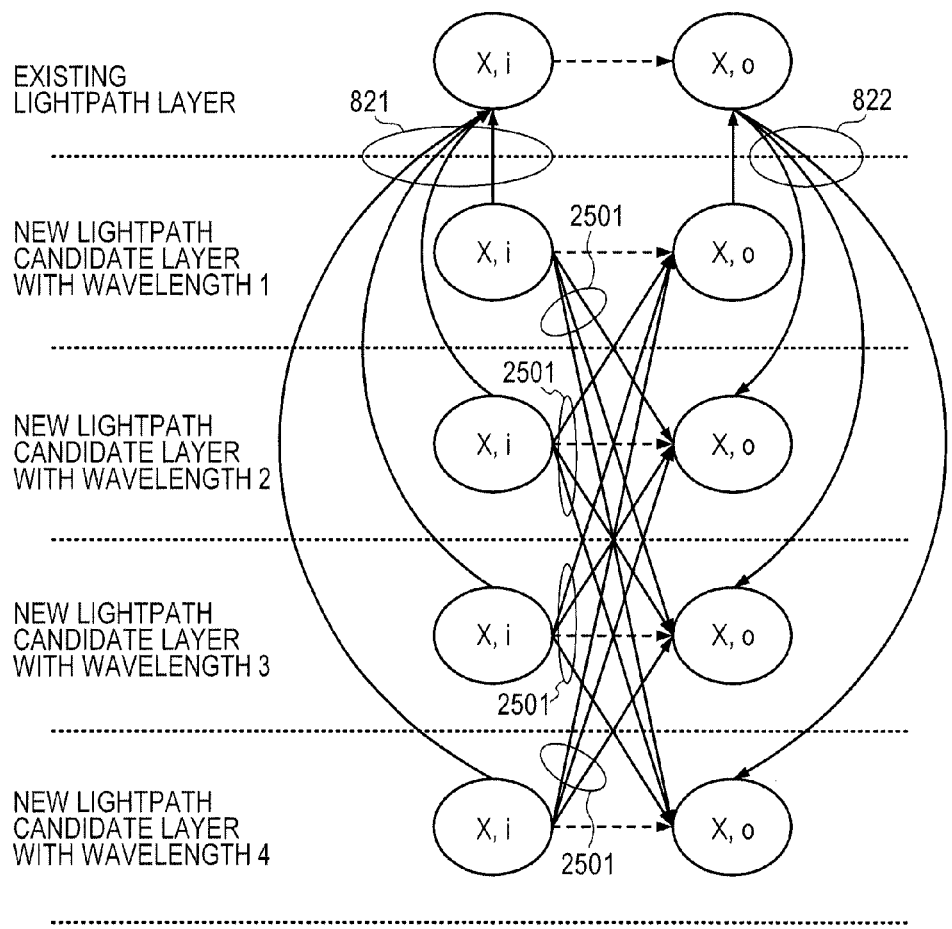
FIG. 25 is a diagram illustrating an example of an inter-layer connection state, according to a third embodiment.

FIG. 25 is a diagram illustrating an example of an inter-layer connection state, according to a third embodiment. FIG. 25 indicates nodes and edges that interconnect layers on an auxiliary graph and are created in association with one physical node vx. Each solid line in FIG. 25 indicates an edge that interconnects layers. In a manner similar to the first embodiment (FIG. 8B), inter-layer edges include edges 821 that extend from the corresponding in-nodes in a plurality of new lightpath candidate layers to the in-node in the existing lightpath layer and edges 822 that extend from the out-node in the existing lightpath layer to the corresponding out-nodes in the plurality of new lightpath candidate layers.

In the third embodiment, auxiliary graph includes edges 2501 each of which extends from an in-node in a new lightpath candidate layer corresponding to a first wavelength, to an out-node in a new lightpath candidate layer corresponding to a second wavelength. Addition of these edges 2501 allows the auxiliary graph to represent conversion of wavelengths from the first wavelength to the second wavelength that is performed in an intermediate node along one lightpath. This allows the auxiliary graph to be applied to a wavelength-convertible network.

As described above, a configuration according to the third embodiment differs from those of the first and second embodiments only in a method of creating an inter-layer edge. Therefore, the description below focuses on a method of creating an inter-layer edge in the case where the wavelength conversion function is provided for a physical node. Let $P_{conv}$ be power consumption per wavelength converter, and a method of creating an inter-layer edge will be described for the following cases:

(Case-A) Conversion to a desired wavelength is possible regardless of the input wavelength, and (Case-B) The output wavelength is restricted depending on the input wavelength.

(Method of Creating Inter-layer Edges in Case-A)

When conversion to a desired wavelength is possible regardless of the input wavelength (Case-A), the inter-layer connecting unit 503 creates inter-layer edges among nodes that correspond to physical nodes and are included in an auxiliary graph, for example, in the following procedures (1) to (3). In the description below, a set of wavelength identifiers identifying wavelengths assigned to waves that are multiplexed in one optical fiber is represented by W, the wavelength identifier identifying the wavelength of input wave is represented by p, and the wavelength identifier identifying the converted wavelength is represented by q. Hereinafter, a wavelength identified by p or q will be also expressed as "wavelength p" or "wavelength q", respectively.

(1). An edge extending from $v^{N,p}_{i,in}$ to $v^{E}_{i,in}$ (an edge extending from a new lightpath candidate layer to the existing lightpath layer) is created for each wavelength p∈W. The weight of the edge is set at the minimum value.

(2). An edge extending from $v^{E}_{i,out}$ to $v^{N,p}_{i,out}$ (an edge extending from the existing lightpath candidate layer to a new lightpath candidate layer) is created for each wavelength identifier p∈W. The weight of the edge is set at the minimum value.

(3). When a wavelength converter that is able to use wavelength p as the input wavelength and to convert the input wavelength p to wavelength q for any pair of wavelength identifiers p∈W and q∈W, an edge extending from $v^{N,p}_{i,in}$ to $v^{N,q}_{i,out}$ (an edge extending from a first new lightpath candidate layer to a second new lightpath candidate layer) is created for each pair of wavelength identifiers p∈W and q∈W. The weight of the edge is set at power consumption $P_{conv}$ of the wavelength converter. For example, when the number of wavelengths is 4 (that is, wavelengths 1 to 4 are used), inter-layer edges for physical node x are created as illustrated in FIG. 25.

(Method of Creating Inter-layer Edges in Case-B)

When the output wavelength is restricted depending on the input wavelength (Case-B), the inter-layer connecting unit 503 creates inter-layer edges among nodes that correspond to physical nodes and are included in an auxiliary graph, for example, in the following procedures (1) to (3). (1). An edge extending from $v^{N,p}_{i,in}$ to $v^{E}_{i,in}$ (an edge extending from a new lightpath candidate layer to the existing lightpath layer) is created for each wavelength identifier p∈W. The weight of the edge is set at the minimum value.

(2). An edge extending from $v^{E}_{i,out}$ to $v^{N,p}_{i,out}$ (an edge extending from the existing lightpath candidate layer to a new lightpath candidate layer) is created for each wavelength identifier p∈W. The weight of the edge is set at the minimum value.

(3). When a wavelength converter is able to use wavelength p as the input wavelength and to convert the input wavelength p to wavelength q that is determined depending on the wavelength p, an edge extending from $v^{N,p}_{i,in}$ to $v^{N,q}_{i,out}$ (an edge extending from a first new lightpath candidate layer to a second new lightpath candidate layer) is created for each pair of wavelength identifiers p∈W and q∈W where q is determined depending on p. The weight of the edge is set at power consumption $P_{conv}$ of the wavelength converter.

Figure 26:
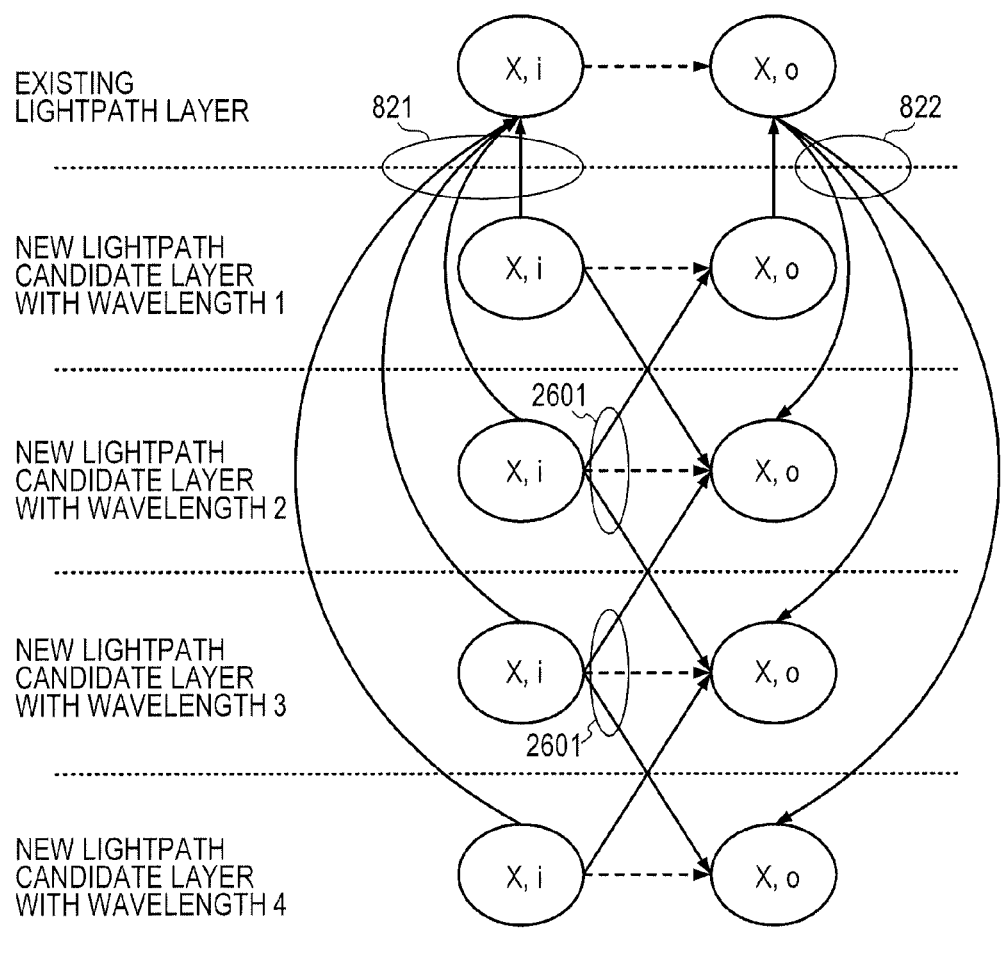
FIG. 26 is a diagram illustrating an example of an inter-layer connection state, according to a third embodiment.

FIG. 26 is a diagram illustrating an example of an inter-layer connection state, according to a third embodiment. FIG. 26 illustrates an example of an inter-layer connection state when an output wavelength is restricted depending on an input wavelength. In FIG. 26, inter-layer edges are created for physical node x when identifier q identifying an output wavelength to which an input wavelength identified by identifier p is converted satisfies the equation: max (1, p−k)=<q=<min (M, p+k) where M is the number of wavelengths (the maximum wavelength identifier) and k is a parameter indicating a restriction on the output wavelength.

In the example of FIG. 26, it is assumed that M (the number of wavelengths) is 4 and parameter k is 2. That is, FIG. 26 illustrates an example in which input wavelength identified by p is converted within wavelengths identified by wavelength identifier range of p±k. In the example of FIG. 26, since k is 2, conversions to one or two other wavelengths (up to two other wavelengths) are possible between adjacent new lightpath candidate layers. In FIG. 26, edges 2601 indicate conversions to two other wavelengths.

FIG. 27 is a diagram illustrating an example of an operational flowchart for creating inter-layer connections, according to a third embodiment.

In operation S2701, the inter-layer connecting unit 503 retrieves one physical node.

In operation S2702, the inter-layer connecting unit 503 selects one wavelength.

In operation S2703, the inter-layer connecting unit 503 creates an edge that extends from an in-node that is in a new lightpath candidate layer corresponding to the selected wavelength and corresponds to the retrieved physical node, to an in-node that is in the existing lightpath layer and corresponds to the retrieved physical node.

In operation S2704, the inter-layer connecting unit 503 sets a weight of the created edge at the minimum value ε.

In operation S2705, the inter-layer connecting unit 503 creates an edge that extends from an out-node that is in the existing lightpath layer and corresponds to the retrieved physical node, to an out-node that is in the new lightpath candidate layer corresponding to the selected wavelength and corresponds to the retrieved physical node.

In operation S2706, the inter-layer connecting unit 503 sets a weight of the created edge at the minimum value ε.

In operation S2707, it is determined whether all wavelengths have been selected. When all the wavelengths have not been selected (NO in operation S2707), the processing returns to step S2702. When all the wavelengths have been selected (YES in operation S2707), in operation S2708, the inter-layer connecting unit 503 selects two different wavelengths identified by x and y.

In operation S2709, for the two selected wavelengths x and y, it is determined whether conversion from wavelength x to wavelength y is allowed. When conversion from wavelength x to wavelength y is allowed (YES in operation S2709), in operation S2710, the inter-layer connecting unit 503 creates an edge that extends from an in-node that is in a new lightpath candidate layer corresponding to wavelength x and corresponds to the retrieved physical node, to an out-node that is in a new lightpath candidate layer corresponding to wavelength y and corresponds to the retrieved physical node. When conversion from wavelength x to wavelength y is not allowed (NO in operation S2709), the processing proceeds to step S2712.

In operation S2711, the inter-layer connecting unit 503 sets a weight of the edge at the power consumption of the wavelength converter.

In operation S2712, it is determined whether all combinations of two different wavelengths have been selected. When all the combinations of two different wavelengths have been selected (YES in operation S2712), in operation S2713, it is determined whether all physical nodes have been retrieved. When all combinations of two different wavelengths have not been selected (NO in operation S2712), the processing returns to step S2708.

When all the physical nodes have not been retrieved (NO in operation S2713), the processing returns to step S2701. When all physical nodes have been retrieved (YES in operation S2713), the processing is terminated.

Next, path calculation on the auxiliary graph will be described. In the third embodiment, when traffic is generated from $v_s \in V_{router}$ to $v_d \in V_{router}$ (s≠d), in a manner similar to the first embodiment, the minimum weight path calculating unit 202 may obtain a path that minimizes an increase in power consumption, by obtaining, on the auxiliary graph created by the auxiliary graph creating unit 201, a minimum weight path from node $v^E_{s,in}$ of the existing lightpath layer to node $v^E_{d,out}$ of the existing lightpath layer. That is, the procedure for obtaining a path of new lightpaths from the auxiliary graph may be performed in a manner similar to the first embodiment (see FIG. 19).

After the minimum weight path has been obtained, a lightpath to be newly set is obtained by tracing the obtained minimum weight path. In the case where a physical node is provided with the wavelength conversion function, the obtained minimum weight path is traced in a way different from the first embodiment.

In the first embodiment, longest continuous path segments are obtained within a new lightpath candidate layer that uses the same wavelength. That is, a new lightpath is to be set between first and second physical nodes that correspond to a start node at which the obtained longest continuous path segments starts in the new lightpath candidate layer and an end node at which the obtained longest continuous path segments ends in the same new lightpath candidate layer, respectively. This is because that one lightpath needs to use the same wavelength since the wavelength conversion function is not provided for a physical node.

In the third embodiment, however, longest continuous path segments may be obtained over one or more new lightpath candidate layers regardless of a wavelength used by each of the one or more new lightpath candidate layers. That is, the longest continuous path segments may be obtained in such a manner that, after an edge extending from an out-node in the existing lightpath layer (a start node) to an in-node in a first new lightpath candidate layer is traced, edge tracing is performed starting from the in-node in the first new lightpath candidate layer until reaching an in-node in the existing lightpath layer (an end node). This indicates that a new lightpath is to be set between first and second physical nodes that correspond to the start node at which the obtained longest continuous path segments starts on the auxiliary graph and the end node at which the obtained longest continuous path segments ends on the auxiliary graph, respectively. This is because that one lightpath is able to use a plurality of wavelengths using the wavelength conversion function provided for a physical node.

In the third embodiment described above, in addition to the advantages in the first embodiment, a path that minimizes an increment in power consumption may be obtained by applying the third embodiment to a wavelength-convertible optical network. That is, a new lightpath may be set in consideration of restrictions on the insertion of optical regenerators, the ability or inability of the optical regenerator to carry out wavelength conversion, and an increase in power consumption of the optical regenerator.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for setting a lightpath in an optical network, the apparatus comprising:
a processor to:
create an auxiliary graph representing connection relations between nodes on a plurality of lightpaths in the optical network using a plurality of edges each connecting a pair of nodes on the plurality of lightpaths, the plurality of lightpaths including first and second one or more lightpaths, the first one or more lightpaths indicating lightpaths that exist in the optical network, the second one or more lightpaths indicating candidate lightpaths that are to be set to accommodate traffic that is newly generated for the optical network, each of the plurality of edges being assigned a weight value indicating a magnitude of increase in power consumption of network devices that are allocated to a lightpath in association with the each of the plurality of edges, and
obtain, for start and end nodes in the optical network, a minimum weight path that has a path weight value minimum among paths each being a continuous sequence of edges that starts from the start node and reaches the end node, the path weight value being a total sum of weight values assigned to the continuous sequence of edges; and
a memory to store information on the auxiliary graph,
wherein
the auxiliary graph is configured to include:
an existing lightpath layer representing connection relations between nodes on the first one or more lightpaths, and
one or more new lightpath candidate layers representing connection relations between nodes on the second one or more lightpaths;
in each of the one or more new lightpath candidate layers, in-node and out-node are created in association with each of physical nodes existing on the first one or more lightpaths;
presence or absence of an edge connecting the in-node and out-node indicates respectively an usable state or non-usable state of an optical regenerator that is allocated in the optical network in association with the edge; and
a weight value corresponding to a power consumption of the optical regenerator is assigned to the edge connecting the in-node and out-node when the optical regenerator is in the usable state for the edge connecting the in-node and out-node.

2. The apparatus of claim 1, wherein
the one or more new lightpath candidate layers are created so that the number of the one or more new lightpath candidate layers is equal to the number of wavelengths that are used for traffic in the optical network.

3. The apparatus of claim 1, wherein
in each of the one or more new lightpath candidate layers, an edge is created between a pair of nodes associated with a pair of physical nodes between which a lightpath is allowed to be set without using an optical regenerator.

4. The apparatus of claim 1, wherein
an edge is created between first and second nodes associated with a physical node on the optical network, the first node being represented in the existing lightpath layer, the second node being represented in one of the one or more new lightpath candidate layers.

5. The apparatus of claim 1, wherein, when a physical node on the optical network is able to convert a wavelength, an edge is created between first and second nodes associated with the physical node, the first and second nodes being represented respectively in first and second new lightpath candidate layers included in the one or more new lightpath candidate layers.

6. The apparatus of claim 1, wherein, when a physical node in the optical network is able to convert a first wavelength of an input wave into a second wavelength that is an output wavelength and selected as any one of wavelengths used in the optical network regardless of the first wavelength, an edge is created from a first node that is associated with the physical node and represented in a first new lightpath candidate layer corresponding to the first wavelength, to a second node that is associated with the physical node and represented in each of the one or more new lightpath candidate layers excluding the first new lightpath candidate layer.

7. The apparatus of claim 1, wherein, when a physical node on the optical network is able to convert a first wavelength of an input wave into at least one second wavelength that is at least one output wavelength and determined depending on the first wavelength, an edge is created from a first node that is associated with the physical node and represented in a first new lightpath candidate layer corresponding to the first wavelength, to each of at least one new lightpath candidate layer that is respectively associated with the at least one second wavelength.

8. The apparatus of claim 1, wherein
each of the set of edges is assigned, as the weight value, a magnitude of increase in power consumption that is caused by the network devices when the optical network has accommodated traffic to be routed.

9. The apparatus of claim 1, wherein
the processor generates the auxiliary graph each time traffic is generated in the optical network.

10. The apparatus of claim 1, wherein
the processor updates the auxiliary graph each time traffic is generated in the optical network.

11. The apparatus of claim 1, wherein
the processor selects a longest continuous sequence of edges that are represented in one of the one or more new lightpath candidate layers and included in the minimum weight path, and
the processor sets a new lightpath between a pair of physical nodes that are associated with start and end nodes of the selected longest continuous sequence of edges, respectively.

12. A non-transitory computer readable storage medium storing a program that runs on a processor, the program comprising:
creating, using the processor, an auxiliary graph representing connection relations between nodes on a plurality of lightpaths in the optical network using a plurality of edges each connecting a pair of nodes on the plurality of lightpaths, the plurality of lightpaths including first and second one or more lightpaths, the first one or more lightpaths indicating lightpaths that exist in the optical network, the second one or more lightpaths indicating candidate lightpaths that are to be set to accommodate traffic that is newly generated for the optical network, each of the plurality of edges being assigned a weight value indicating a magnitude of increase in power consumption of network devices that are allocated to a lightpath in association with the each of the plurality of edges, and
obtaining, for start and end nodes in the optical network, a minimum weight path that has a path weight value minimum among paths each being a continuous sequence of edges that starts from the start node and reaches the end node, the path weight value being a total sum of weight values assigned to the continuous sequence of edges, wherein
the auxiliary graph is configured to include:
an existing lightpath layer representing connection relations between nodes on the first one or more lightpaths, and
one or more new lightpath candidate layers representing connection relations between nodes on the second one or more lightpaths;
in each of the one or more new lightpath candidate layers, in-node and out-node are created in association with each of physical nodes existing on the first one or more lightpaths;
presence or absence of an edge connecting the in-node and out-node indicates respectively an usable state or non-usable state of an optical regenerator that is allocated in the optical network in association with the edge; and
a weight value corresponding to a power consumption of the optical regenerator is assigned to the edge connecting the in-node and out-node when the optical regenerator is in the usable state for the edge connecting the in-node and out-node.

13. The non-transitory computer readable storage medium of claim 12, wherein the program further comprises:
selecting a longest continuous sequence of edges that are represented in one of the one or more new lightpath candidate layers and included in the minimum weight path; and
setting a new lightpath between a pair of physical nodes that are associated with start and end nodes of the selected longest continuous sequence of edges, respectively.

14. The non-transitory computer readable storage medium of claim 13, wherein, when a physical node on the optical network is able to convert a wavelength, an edge is created between first and second nodes associated with the physical node, the first and second nodes being represented respectively in first and second new lightpath candidate layers included in the one or more new lightpath candidate layers.

15. The non-transitory computer readable storage medium of claim 12, wherein
the one or more new lightpath candidate layers are created so that the number of the one or more new lightpath candidate layers is equal to the number of wavelengths that are used for traffic in the optical network.

16. The non-transitory computer readable storage medium of claim 12, wherein
an edge is created between first and second nodes associated with a physical node on the optical network, the first node being represented in the existing lightpath layer, the second node being represented in one of the one or more new lightpath candidate layers.

* * * * *